US010983565B2

(12) United States Patent
Christmas et al.

(10) Patent No.: US 10,983,565 B2
(45) Date of Patent: Apr. 20, 2021

(54) PORTABLE STORAGE DEVICE WITH MODULAR POWER AND HOUSING SYSTEM

(71) Applicant: Fasetto, Inc., Superior, WI (US)

(72) Inventors: Coy Christmas, Superior, WI (US); Luke Malpass, Stoke-on-Trent (GB)

(73) Assignee: Fasetto, Inc., Superior, WI (US)

( * ) Notice: Subject to any disclaimer, the term of this patent is extended or adjusted under 35 U.S.C. 154(b) by 0 days.

(21) Appl. No.: 16/554,373

(22) Filed: Aug. 28, 2019

(65) Prior Publication Data

US 2019/0391616 A1    Dec. 26, 2019

Related U.S. Application Data

(63) Continuation of application No. 15/644,556, filed on Jul. 7, 2017, now Pat. No. 10,437,288, which is a
(Continued)

(51) Int. Cl.
*G06F 1/16* (2006.01)
*G06F 13/10* (2006.01)
(Continued)

(52) U.S. Cl.
CPC .......... *G06F 1/1656* (2013.01); *G06F 1/1635* (2013.01); *G06F 13/102* (2013.01);
(Continued)

(58) Field of Classification Search
CPC .... G06F 1/1632; G06F 1/1633; G06F 1/1635; G06F 1/1684
See application file for complete search history.

(56) References Cited

U.S. PATENT DOCUMENTS 5,003,596 A    3/1991  Wood
5,303,388 A    4/1994  Kreitman
(Continued)

FOREIGN PATENT DOCUMENTS

AU    2013352236    11/2018
CN     103945003     7/2001
(Continued)

OTHER PUBLICATIONS

USPTO; Non-Final Office Action dated Oct. 8, 2015 in U.S. Appl. No. 14/092,165.
(Continued)

*Primary Examiner* — Anthony Q Edwards
(74) *Attorney, Agent, or Firm* — Snell & Wilmer L.L.P.

(57) ABSTRACT

A modular portable storage system includes a portable storage device with a housing having a cuboid geometry. The housing retains a processor, a storage module in electronic communication with the processor, and a wireless communication module. A circuit may communicate electronically with the portable storage device. The portable storage device may be removably coupled to the circuit board. A power supply may be in electronic communication with the circuit board. The power supply may also be removably coupled to the circuit board. The portable storage device and the power supply may be removably retained within the external housing. The circuit board may be mechanically coupled to the external housing. A case for a mobile device may define a cavity to retain the portable storage device.

15 Claims, 21 Drawing Sheets

Related U.S. Application Data continuation-in-part of application No. 14/745,100, filed on Jun. 19, 2015, now Pat. No. 10,123,153.

(60) Provisional application No. 62/060,379, filed on Oct. 6, 2014, provisional application No. 62/520,336, filed on Jun. 15, 2017.

(51) Int. Cl.
*H04L 29/08* (2006.01)
*H04W 4/80* (2018.01)
*H04W 8/00* (2009.01)

(52) U.S. Cl.
CPC .............. *H04L 67/06* (2013.01); *H04L 67/16* (2013.01); *H04W 4/80* (2018.02); *H04W 8/005* (2013.01)

(56) References Cited

U.S. PATENT DOCUMENTS

| | | | |
|---|---|---|---|
| 5,664,228 A * | 9/1997 | Mital | G06F 1/1626 235/380 |
| 5,678,015 A | 10/1997 | Goh | |
| 5,689,287 A | 11/1997 | MacKinlay | |
| 5,689,654 A | 11/1997 | Kikinis et al. | |
| 5,729,471 A | 3/1998 | Jain | |
| 5,861,873 A * | 1/1999 | Kikinis | G06F 1/1626 345/157 |
| 5,870,548 A | 2/1999 | Nielsen | |
| 5,956,038 A | 9/1999 | Rekimoto | |
| 5,963,215 A | 10/1999 | Rosenzweig | |
| 5,982,295 A | 11/1999 | Goto et al. | |
| 6,002,403 A | 12/1999 | Sugiyama | |
| 6,008,809 A | 12/1999 | Brooks | |
| 6,029,183 A | 2/2000 | Jenkins | |
| 6,160,488 A | 12/2000 | Honda | |
| 6,489,932 B1 | 12/2002 | Chitturi | |
| 6,497,367 B2 | 12/2002 | Conzola et al. | |
| 6,553,360 B1 | 4/2003 | Hoekstra | |
| 6,581,068 B1 | 6/2003 | Bensoussan | |
| 6,597,358 B2 | 7/2003 | Miller | |
| 6,652,170 B1 | 11/2003 | Arnold | |
| 6,710,788 B1 | 3/2004 | Freach et al. | |
| 6,922,815 B2 | 7/2005 | Rosen | |
| 6,938,218 B1 | 8/2005 | Rosen | |
| 6,952,409 B2 | 10/2005 | Jolitz | |
| 7,054,963 B2 | 5/2006 | Betts-Lacroix | |
| 7,134,095 B1 | 11/2006 | Smith | |
| 7,149,836 B2 | 12/2006 | Yu | |
| 7,216,305 B1 | 5/2007 | Jaeger | |
| 7,428,702 B1 | 9/2008 | Cervantes et al. | |
| 7,480,872 B1 | 1/2009 | Ubillos | |
| 7,516,484 B1 | 4/2009 | Arnouse | |
| 7,533,408 B1 | 5/2009 | Arnouse | |
| 7,725,839 B2 | 5/2010 | Michaels | |
| 7,761,813 B2 | 7/2010 | Kim | |
| D654,931 S | 2/2012 | Lemelman | |
| 8,111,255 B2 | 2/2012 | Park | |
| 8,117,563 B2 | 2/2012 | Ok | |
| 8,264,488 B2 | 9/2012 | Ueno | |
| 8,386,686 B2 | 2/2013 | Lin | |
| 8,390,255 B1 | 3/2013 | Fathollahi | |
| 8,405,502 B2 | 3/2013 | Teague | |
| 8,483,758 B2 * | 7/2013 | Huang | H04M 1/0283 455/557 |
| 8,497,859 B1 | 7/2013 | Hickman et al. | |
| 8,510,680 B2 | 8/2013 | Kang | |
| 8,587,590 B2 | 11/2013 | Erickson et al. | |
| 8,614,885 B2 | 12/2013 | Solomon | |
| 8,634,883 B2 | 1/2014 | Hong | |
| 8,699,218 B2 | 4/2014 | Xu | |
| 8,745,535 B2 | 6/2014 | Chaudhri | |
| 8,810,430 B2 | 8/2014 | Proud | |
| 8,924,862 B1 | 12/2014 | Luo | |
| 8,935,438 B1 | 1/2015 | Ivanchenko | |
| 8,996,795 B2 * | 3/2015 | Mardiks | G06F 13/385 711/103 |
| 9,047,050 B2 | 6/2015 | Medica | |
| 9,178,976 B2 | 11/2015 | Djordjevic | |
| 9,247,303 B2 | 1/2016 | Phang | |
| 9,288,295 B2 | 3/2016 | Ivanovski | |
| 9,356,267 B1 * | 5/2016 | To | H01M 2/1066 |
| 9,360,991 B2 | 6/2016 | Celebisoy | |
| 9,378,588 B2 | 6/2016 | Song | |
| 9,390,082 B1 | 7/2016 | Stolte et al. | |
| 9,405,435 B2 | 8/2016 | Hendricks | |
| 9,437,038 B1 | 9/2016 | Costello | |
| 9,495,375 B2 | 11/2016 | Huang | |
| 9,516,151 B2 * | 12/2016 | Moran | H04L 9/32 |
| 9,584,402 B2 | 2/2017 | Christmas et al. | |
| 9,626,341 B1 | 4/2017 | Guan et al. | |
| 9,658,651 B2 * | 5/2017 | Balogh | H04M 1/185 |
| 9,684,887 B2 | 6/2017 | Majeti et al. | |
| 9,811,810 B1 | 11/2017 | Ranganath | |
| 9,886,229 B2 | 2/2018 | Christmas | |
| 10,075,502 B2 | 9/2018 | Malpass | |
| 10,084,688 B2 | 9/2018 | Christmas et al. | |
| 10,095,873 B2 | 10/2018 | Christmas et al. | |
| 10,122,483 B2 | 11/2018 | Gonzales, Jr. | |
| 10,123,153 B2 | 11/2018 | Christmas et al. | |
| 10,231,013 B2 | 3/2019 | Besehanic | |
| 10,411,406 B1 | 9/2019 | Hill | |
| 10,614,234 B2 | 4/2020 | Christmas et al. | |
| 2001/0028369 A1 | 10/2001 | Gallo et al. | |
| 2001/0033654 A1 | 10/2001 | Wieser | |
| 2001/0044578 A1 | 11/2001 | Ben-Haim | |
| 2002/0085681 A1 | 7/2002 | Jensen | |
| 2002/0105529 A1 | 8/2002 | Bowser et al. | |
| 2002/0105551 A1 | 8/2002 | Kamen | |
| 2002/0138543 A1 | 9/2002 | Teng | |
| 2002/0146119 A1 | 10/2002 | Liss | |
| 2003/0074529 A1 | 4/2003 | Crohas | |
| 2003/0126272 A1 | 7/2003 | Cori et al. | |
| 2003/0126335 A1 | 7/2003 | Silvester | |
| 2003/0131050 A1 | 7/2003 | Vincent | |
| 2003/0142136 A1 | 7/2003 | Carter | |
| 2003/0217097 A1 | 11/2003 | Eitel | |
| 2004/0088280 A1 | 5/2004 | Koh et al. | |
| 2004/0104932 A1 | 6/2004 | Brebner | |
| 2004/0205091 A1 | 10/2004 | Mulcahy | |
| 2004/0213273 A1 | 10/2004 | Ma | |
| 2005/0005246 A1 | 1/2005 | Card | |
| 2005/0076216 A1 | 4/2005 | Nyberg | |
| 2005/0097008 A1 | 5/2005 | Ehring | |
| 2005/0165651 A1 | 7/2005 | Mohan | |
| 2005/0185364 A1 | 8/2005 | Bell | |
| 2005/0224589 A1 | 10/2005 | Park et al. | |
| 2005/0237704 A1 | 10/2005 | Ceresoli | |
| 2005/0271207 A1 | 12/2005 | Frey | |
| 2005/0283488 A1 | 12/2005 | Colossi et al. | |
| 2006/0047952 A1 | 3/2006 | Van Den Heuvel et al. | |
| 2006/0057960 A1 | 3/2006 | Tran | |
| 2006/0075225 A1 | 4/2006 | Flynn et al. | |
| 2006/0085741 A1 | 4/2006 | Weiner | |
| 2006/0090122 A1 | 4/2006 | Pyhalammi et al. | |
| 2006/0112270 A1 | 5/2006 | Erez | |
| 2006/0130004 A1 | 6/2006 | Hughes et al. | |
| 2006/0149825 A1 | 7/2006 | Kim | |
| 2006/0159028 A1 | 7/2006 | Curran-Gray | |
| 2006/0161631 A1 | 7/2006 | Lira | |
| 2006/0193472 A1 | 8/2006 | Yuen | |
| 2006/0200518 A1 | 9/2006 | Sinclair et al. | |
| 2006/0239275 A1 | 10/2006 | Zlateff et al. | |
| 2006/0239375 A1 | 10/2006 | Kim et al. | |
| 2006/0294386 A1 | 12/2006 | Yuval et al. | |
| 2007/0050778 A1 | 3/2007 | Lee | |
| 2007/0120846 A1 | 5/2007 | Ok et al. | |
| 2007/0130541 A1 | 6/2007 | Louch | |
| 2007/0158408 A1 | 7/2007 | Wang et al. | |
| 2007/0160198 A1 | 7/2007 | Orsini et al. | |
| 2007/0168614 A1 | 7/2007 | Jianjun et al. | |
| 2007/0245048 A1 | 10/2007 | Ozcan et al. | |
| 2007/0271580 A1 | 11/2007 | Tischer et al. | |

(56) References Cited

U.S. PATENT DOCUMENTS

| | | |
|---|---|---|
| 2007/0273675 A1 | 11/2007 | Wangler |
| 2007/0279852 A1 | 12/2007 | Daniel et al. |
| 2007/0282601 A1 | 12/2007 | Li |
| 2008/0024976 A1 | 1/2008 | Hardson et al. |
| 2008/0052461 A1 | 2/2008 | Kavian |
| 2008/0069358 A1 | 3/2008 | Yang |
| 2008/0080709 A1 | 4/2008 | Michtchenko et al. |
| 2008/0181141 A1 | 7/2008 | Krantz |
| 2008/0186305 A1 | 8/2008 | Carter |
| 2008/0222238 A1 | 9/2008 | Ivanov et al. |
| 2008/0223890 A1 | 9/2008 | Tecchiolli et al. |
| 2008/0235629 A1 | 9/2008 | Porter et al. |
| 2008/0241809 A1 | 10/2008 | Ashmore |
| 2008/0250179 A1 | 10/2008 | Moon |
| 2008/0305738 A1 | 12/2008 | Khedouri et al. |
| 2008/0313450 A1 | 12/2008 | Rosenberg |
| 2008/0317068 A1 | 12/2008 | Sagar |
| 2009/0009605 A1 | 1/2009 | Ortiz |
| 2009/0116445 A1 | 5/2009 | Samar et al. |
| 2009/0144653 A1 | 6/2009 | Ubillos |
| 2009/0146775 A1 | 6/2009 | Bonnaud et al. |
| 2009/0239468 A1 | 9/2009 | He |
| 2009/0240598 A1 | 12/2009 | Kargman |
| 2009/0300025 A1 | 12/2009 | Rothschild et al. |
| 2010/0007768 A1 | 1/2010 | Yong et al. |
| 2010/0020035 A1 | 1/2010 | Ryu et al. |
| 2010/0078343 A1 | 4/2010 | Hoellwarth |
| 2010/0088634 A1 | 4/2010 | Tsuruta |
| 2010/0093412 A1 | 4/2010 | Serra |
| 2010/0122207 A1 | 5/2010 | Kim et al. |
| 2010/0161743 A1 | 6/2010 | Krishnamurthi |
| 2010/0169639 A1 | 7/2010 | Jeffries |
| 2010/0169836 A1 | 7/2010 | Stallings |
| 2010/0225735 A1 | 9/2010 | Shaffer |
| 2010/0238089 A1 | 9/2010 | Massand |
| 2010/0256624 A1 | 10/2010 | Brannon |
| 2010/0268929 A1 | 10/2010 | Fumiyoshi |
| 2010/0281138 A1 | 11/2010 | Froirntchuk et al. |
| 2010/0309228 A1 | 12/2010 | Mattos et al. |
| 2010/0313154 A1 | 12/2010 | Choi et al. |
| 2010/0315225 A1 | 12/2010 | Harrison et al. |
| 2010/0315417 A1 | 12/2010 | Cho et al. |
| 2011/0051642 A1 | 3/2011 | Krishnaswamy |
| 2011/0063211 A1 | 3/2011 | Hoerl et al. |
| 2011/0090534 A1 | 4/2011 | Terao et al. |
| 2011/0107269 A1 | 5/2011 | Chiu et al. |
| 2011/0113251 A1 | 5/2011 | Lu et al. |
| 2011/0131660 A1 | 6/2011 | Claessen et al. |
| 2011/0134110 A1 | 6/2011 | Song et al. |
| 2011/0138175 A1 | 6/2011 | Clark |
| 2011/0179368 A1 | 7/2011 | King et al. |
| 2011/0256905 A1* | 10/2011 | Ryan ............... H04N 21/41407 455/556.1 |
| 2011/0283208 A1 | 11/2011 | Gallo |
| 2011/0287808 A1 | 11/2011 | Huang |
| 2011/0294474 A1 | 12/2011 | Barany et al. |
| 2011/0295392 A1 | 12/2011 | Cunnington et al. |
| 2011/0296339 A1 | 12/2011 | Kang |
| 2011/0310100 A1 | 12/2011 | Adimatyam et al. |
| 2012/0011200 A1 | 1/2012 | Zhang et al. |
| 2012/0034897 A1 | 2/2012 | Kreitzer |
| 2012/0047517 A1 | 2/2012 | Townsend et al. |
| 2012/0128172 A1 | 5/2012 | Alden |
| 2012/0155510 A1 | 6/2012 | Hirsch et al. |
| 2012/0166953 A1 | 6/2012 | Affronti et al. |
| 2012/0194976 A1 | 8/2012 | Golko et al. |
| 2012/0200567 A1 | 8/2012 | Mandel |
| 2012/0203824 A1 | 8/2012 | Oommen |
| 2012/0209630 A1 | 8/2012 | Ihm |
| 2012/0242845 A1 | 9/2012 | Tan |
| 2012/0260218 A1 | 10/2012 | Bawel |
| 2012/0267432 A1 | 10/2012 | Kuttuva |
| 2012/0282858 A1 | 11/2012 | Gill et al. |
| 2012/0293509 A1 | 11/2012 | Barnsley |
| 2012/0310446 A1 | 12/2012 | Murphy |
| 2013/0028419 A1 | 1/2013 | Das et al. |
| 2013/0046813 A1 | 2/2013 | Yuan |
| 2013/0050117 A1 | 2/2013 | Cho et al. |
| 2013/0073692 A1 | 3/2013 | Isaza |
| 2013/0077529 A1 | 3/2013 | Lueckenhoff et al. |
| 2013/0080541 A1 | 3/2013 | Herbert |
| 2013/0097239 A1 | 4/2013 | Brown et al. |
| 2013/0111038 A1 | 5/2013 | Girard |
| 2013/0125000 A1 | 5/2013 | Fleischhauer |
| 2013/0145171 A1 | 6/2013 | Hsien |
| 2013/0145384 A1 | 6/2013 | Krum |
| 2013/0152113 A1 | 6/2013 | Conrad et al. |
| 2013/0159080 A1 | 6/2013 | Wu et al. |
| 2013/0159178 A1 | 6/2013 | Colon et al. |
| 2013/0163195 A1* | 6/2013 | Pelletier ............... G06F 1/1656 361/679.55 |
| 2013/0173798 A1 | 7/2013 | Micucci et al. |
| 2013/0201176 A1 | 8/2013 | Lee |
| 2013/0205277 A1 | 8/2013 | Seven et al. |
| 2013/0212112 A1 | 8/2013 | Blom |
| 2013/0217448 A1 | 8/2013 | Kim |
| 2013/0219479 A1 | 8/2013 | Desoto et al. |
| 2013/0225139 A1 | 8/2013 | Moran |
| 2013/0227420 A1 | 8/2013 | Pasquero et al. |
| 2013/0235037 A1 | 9/2013 | Baldwin |
| 2013/0238711 A1 | 9/2013 | Lashkari et al. |
| 2013/0256403 A1 | 10/2013 | MacKinnon |
| 2013/0260819 A1 | 10/2013 | Suzuki et al. |
| 2013/0266065 A1 | 10/2013 | Paczkowski |
| 2013/0266129 A1 | 10/2013 | Pattan et al. |
| 2013/0268802 A1 | 10/2013 | Ito et al. |
| 2013/0268955 A1 | 10/2013 | Conrad |
| 2013/0272196 A1 | 10/2013 | Li |
| 2013/0273983 A1* | 10/2013 | Hsu ............... H04M 1/72527 455/575.1 |
| 2013/0290440 A1 | 10/2013 | Pratt et al. |
| 2013/0300740 A1 | 11/2013 | Snyder |
| 2013/0303160 A1 | 11/2013 | Fong |
| 2013/0317835 A1 | 11/2013 | Matthew |
| 2013/0325970 A1 | 12/2013 | Roberts |
| 2014/0006350 A1 | 1/2014 | Fukui |
| 2014/0012913 A1 | 1/2014 | Varoglu et al. |
| 2014/0026204 A1 | 1/2014 | Buntinx et al. |
| 2014/0034531 A1* | 2/2014 | Wang ............... H04B 1/3888 206/320 |
| 2014/0039804 A1 | 2/2014 | Park et al. |
| 2014/0040777 A1 | 2/2014 | Jones |
| 2014/0055822 A1 | 2/2014 | Hannaway et al. |
| 2014/0078136 A1 | 3/2014 | Sohn |
| 2014/0082547 A1 | 3/2014 | Ding |
| 2014/0106677 A1 | 4/2014 | Altman |
| 2014/0121858 A1 | 5/2014 | Chen |
| 2014/0123033 A1 | 5/2014 | Uhma et al. |
| 2014/0132594 A1 | 5/2014 | Gharpure |
| 2014/0132736 A1 | 5/2014 | Chang |
| 2014/0136429 A1 | 5/2014 | Psihos |
| 2014/0141713 A1 | 5/2014 | Shirinfar |
| 2014/0156725 A1 | 6/2014 | Mandyam |
| 2014/0160824 A1 | 6/2014 | Inomata et al. |
| 2014/0189532 A1 | 7/2014 | Sivaraman et al. |
| 2014/0207657 A1 | 7/2014 | Gacs et al. |
| 2014/0218356 A1 | 8/2014 | Distler |
| 2014/0232817 A1 | 8/2014 | Jones |
| 2014/0258938 A1 | 9/2014 | Christmas |
| 2014/0337640 A1 | 11/2014 | Sharma |
| 2014/0351181 A1 | 11/2014 | Canoy et al. |
| 2014/0355761 A1 | 12/2014 | Kawamura et al. |
| 2015/0009531 A1 | 1/2015 | Kawaguchi |
| 2015/0012617 A1 | 1/2015 | Park et al. |
| 2015/0019628 A1 | 1/2015 | Li |
| 2015/0019983 A1 | 1/2015 | White |
| 2015/0071272 A1 | 3/2015 | Vermani et al. |
| 2015/0082399 A1 | 3/2015 | Wu |
| 2015/0095777 A1 | 4/2015 | Lim |
| 2015/0101018 A1 | 4/2015 | Forte |
| 2015/0106837 A1 | 4/2015 | Li |
| 2015/0133000 A1 | 5/2015 | Kim |
| 2015/0145889 A1 | 5/2015 | Hanai |
| 2015/0194833 A1 | 7/2015 | Fathollahi et al. |

(56) References Cited

U.S. PATENT DOCUMENTS

| | | | |
|---|---|---|---|
| 2015/0256582 A1 | 9/2015 | Bouazizi | |
| 2015/0271271 A1 | 9/2015 | Bullota | |
| 2015/0271299 A1 | 9/2015 | Bullota | |
| 2015/0271307 A1* | 9/2015 | Berg | G06F 1/1698 455/556.1 |
| 2015/0279470 A1 | 10/2015 | Cerrelli et al. | |
| 2015/0281439 A1 | 10/2015 | Dudai | |
| 2015/0319029 A1 | 11/2015 | Abraham et al. | |
| 2015/0339867 A1 | 11/2015 | Amon | |
| 2015/0350813 A1 | 12/2015 | Prats | |
| 2015/0367230 A1 | 12/2015 | Bradford | |
| 2015/0382169 A1 | 12/2015 | Burba | |
| 2016/0014574 A1 | 1/2016 | Christmas et al. | |
| 2016/0037055 A1 | 2/2016 | Waddington | |
| 2016/0100279 A1 | 4/2016 | Christmas et al. | |
| 2016/0134941 A1 | 5/2016 | Selvaraj | |
| 2016/0162244 A1 | 6/2016 | Christmas | |
| 2016/0188468 A1 | 6/2016 | Rao | |
| 2016/0195899 A1 | 7/2016 | Plante | |
| 2016/0226730 A1 | 8/2016 | Schumacher | |
| 2016/0241633 A1 | 8/2016 | Overby, Jr. | |
| 2016/0260319 A1 | 9/2016 | Jeffery | |
| 2016/0269468 A1 | 9/2016 | Malpass | |
| 2017/0034167 A1 | 2/2017 | Figueira | |
| 2017/0134803 A1 | 5/2017 | Shaw | |
| 2017/0160992 A1 | 6/2017 | Christmas | |
| 2017/0300214 A1 | 10/2017 | Roundtree | |
| 2017/0371378 A1 | 12/2017 | Christmas | |
| 2018/0146378 A1 | 5/2018 | Christmas | |
| 2018/0191632 A1 | 7/2018 | Biederman | |
| 2018/0253427 A1 | 9/2018 | Krishnan | |
| 2018/0375641 A1 | 12/2018 | Murguia Cosentino | |
| 2019/0007477 A1 | 1/2019 | Malpass | |
| 2019/0012473 A1 | 1/2019 | Christmas | |
| 2019/0020576 A1 | 1/2019 | Christmas | |
| 2019/0037381 A1 | 1/2019 | Christmas | |
| 2019/0123501 A1 | 4/2019 | Christmas | |
| 2019/0319993 A1 | 10/2019 | Christmas | |
| 2020/0010049 A1 | 1/2020 | Christmas | |

FOREIGN PATENT DOCUMENTS

| | | |
|---|---|---|
| CN | 1881164 | 12/2006 |
| CN | 101388815 | 3/2009 |
| CN | 101401341 | 4/2009 |
| CN | 1023276133 | 3/2012 |
| CN | 102591571 A | 7/2012 |
| CN | 103077462 | 5/2013 |
| CN | 103095852 | 5/2013 |
| CN | 103139767 | 6/2013 |
| CN | 103546181 | 1/2014 |
| CN | 103840942 | 6/2014 |
| CN | 2014141235 | 9/2014 |
| CN | 104220996 | 12/2014 |
| CN | 106797337 | 5/2018 |
| CN | 105706033 | 5/2019 |
| EP | 0800144 | 10/1997 |
| EP | 1168769 | 2/2002 |
| EP | 1806649 | 7/2007 |
| EP | 102008023577 | 11/2009 |
| EP | 2590467 | 5/2013 |
| EP | 3022638 | 4/2018 |
| EP | 3100439 | 1/2020 |
| HK | 1242492 | 6/2018 |
| JP | 09-091155 | 4/1997 |
| JP | 2007-049606 | 2/2007 |
| JP | 2010-535351 | 11/2010 |
| JP | 2011-134159 | 7/2011 |
| JP | 2011-147136 | 7/2011 |
| JP | 2011-248489 | 12/2011 |
| JP | 2013-214801 | 10/2013 |
| JP | 6310477 | 4/2018 |
| JP | 2018-514845 | 6/2018 |
| JP | 6479026 | 2/2019 |
| KR | 10-2004-0108122 | 12/2004 |
| KR | 10-2005-0098078 | 10/2005 |
| KR | 10-20090059672 | 6/2009 |
| KR | 10-20100056594 | 5/2010 |
| KR | 10-20120092487 | 8/2012 |
| KR | 1020120092598 | 8/2012 |
| KR | 10-2012-0059488 | 5/2013 |
| KR | 10-2017-0047866 | 5/2017 |
| RU | 2421800 | 6/2011 |
| TW | 201214150 | 4/2012 |
| TW | 201320681 | 5/2013 |
| TW | 201349811 | 12/2013 |
| TW | 629910 | 7/2018 |
| WO | 2000033545 | 6/2000 |
| WO | 2005050393 | 6/2005 |
| WO | 2006107324 | 10/2006 |
| WO | 2006125027 | 11/2006 |
| WO | 1761048 | 3/2007 |
| WO | 2007076494 | 7/2007 |
| WO | 2007103908 | 9/2007 |
| WO | 2008090902 | 7/2008 |
| WO | 2009016612 | 2/2009 |
| WO | 2010018551 | 8/2010 |
| WO | 2012087847 | 6/2012 |
| WO | 2014012486 | 1/2014 |
| WO | 2014016622 | 1/2014 |
| WO | 2014085502 | 6/2014 |
| WO | 2014138187 | 9/2014 |
| WO | 2014151925 | 9/2014 |
| WO | 2015009944 | 1/2015 |
| WO | 2015048684 | 4/2015 |
| WO | 2015112506 | 7/2015 |
| WO | 2016007780 | 1/2016 |
| WO | 2016057091 | 4/2016 |
| WO | 2016145126 | 9/2016 |
| WO | 2017096245 | 6/2017 |
| WO | 2018098313 | 5/2018 |
| WO | 2018144833 | 8/2018 |
| WO | 2018232186 | 12/2018 |
| WO | 2019079628 | 4/2019 |

OTHER PUBLICATIONS

USPTO; Non-Final Office Action dated Sep. 18, 2015 in U.S. Appl. No. 14/164,919.
USPTO; Non-Final Office Action dated Apr. 5, 2016 in U.S. Appl. No. 14/500,363.
USPTO; Final Office Action dated Jun. 3, 2016 in U.S. Appl. No. 14/092,165.
USPTO; Final Office Action dated Apr. 26, 2016 in U.S. Appl. No. 14/164,919.
USPTO; Non-Final Office Action dated Jun. 22, 2016 in U.S. Appl. No. 14/745,100.
USPTO; Non-Final Office action dated Apr. 22, 2016 in U.S. Appl. No. 14/709,231.
USPTO; Notice of Allowance dated Aug. 16, 2016 in U.S. Appl. No. 14/092,165.
USPTO; Non-Final Office Action dated Oct. 6, 2016 in U.S. Appl. No. 14/197,517.
USPTO; Final Office Action dated Oct. 26, 2016 in U.S. Appl. No. 14/500,363.
USPTO; Final Office Action dated Oct. 11, 2016 in U.S. Appl. No. 14/709,231.
USPTO; Notice of Allowance dated Oct. 14, 2016 in U.S. Appl. No. 14/164,919.
USPTO; Final Office Action dated Dec. 20, 2016 in Appl. No. 14/745,100.
USPTO; Non-Final Office Action dated Nov. 25, 2016 in U.S. Appl. No. 14/795,210.
USPTO; Non-Final Office Action dated Apr. 7, 2017 in U.S. Appl. No. 14/500,363.
USPTO; Non-Final Office Action dated Apr. 14, 2017 in U.S. Appl. No. 14/905,639.
USPTO; Non-Final Office Action dated Apr. 6, 2017 in U.S. Appl. No. 14/709,231.

(56) References Cited

OTHER PUBLICATIONS

USPTO; Non-Final Office Action dated May 4, 2017 in U.S. Appl. No. 14/745,100.
USPTO; Final Office Action dated Jun. 30, 2017 in U.S. Appl. No. 14/197,517.
USPTO; Final Office Action dated Aug. 17, 2017 in U.S. Appl. No. 14/795,210.
USPTO; Notice of Allowance dated Oct. 11, 2017 in U.S. Appl. No. 14/905,639.
USPTO; Final Office Action dated Oct. 3, 2017 in U.S. Appl. No. 14/500,363.
USPTO; Final Office action dated Sep. 29, 2017 in U.S. Appl. No. 14/709,231.
USPTO; Non-Final Office Action dated Oct. 25, 2017 in U.S. Appl. No. 15/435,884.
USPTO; Final Office Action dated Oct. 13, 2017 in U.S. Appl. No. 14/745,100.
USPTO; Notice of Allowance dated Nov. 29, 2017 in U.S. Appl. No. 14/905,639.
USPTO; Non-Final Office Action dated Dec. 12, 2017 in U.S. Appl. No. 15/367,961.
USPTO; Non-Final Office Action dated Jan. 8, 2018 in U.S. Appl. No. 15/065,713.
USPTO; Notice of Allowance dated Feb. 26, 2018 in U.S. Appl. No. 14/745,100.
USPTO; Non-Final Office Action dated Mar. 8, 2018 in U.S. Appl. No. 14/197,517.
USPTO; Notice of Allowance dated May 7, 2018 in U.S. Appl. No. 15/065,713.
USPTO; Notice of Allowance dated May 17, 2018 in U.S. Appl. No. 14/709,231.
USPTO; Non-Final Office Action dated May 18, 2018 in U.S. Appl. No. 15/644,556.
USPTO; Notice of Allowance dated May 22, 2018 in U.S. Appl. No. 15/435,884.
USPTO; Notice of Allowance dated May 29, 2018 in U.S. Appl. No. 15/065,713.
USPTO; Notice of Allowance dated Jun. 20, 2018 in U.S. Appl. No. 15/435,884.
USPTO; Non-Final Office Action dated Jun. 28, 2018 in U.S. Appl. No. 14/795,210.
USPTO; Notice of Allowance dated Jun. 29, 2018 in U.S. Appl. No. 15/065,713.
USPTO; Notice of Allowance dated Jul. 5, 2018 in U.S. Appl. No. 14/745,100.
USPTO; Notice of Allowance dated Jul. 10, 2018 in U.S. Appl. No. 14/709,231.
USPTO; Final Office Action dated Aug. 10, 2018 in U.S. Appl. No. 15/367,961.
USPTO; Notice of Allowance dated Sep. 28, 2018 in U.S. Appl. No. 15/644,556.
USPTO; Final Office Action dated Oct. 18, 2018 in U.S. Appl. No. 14/197,517.
USPTO; Advisory Action dated Dec. 19, 2018 in U.S. Appl. No. 15/367,961.
USPTO; Non-Final Office Action dated Feb. 6, 2019 in U.S. Appl. No. 15/644,556.
USPTO; Final Office Action dated Feb. 7, 2019 in U.S. Appl. No. 14/795,210.
USPTO; Non-Final Office Action dated Mar. 7, 2019 in U.S. Appl. No. 15/367,961.
USPTO; Advisory Action dated Mar. 12, 2019 in U.S. Appl. No. 14/197,517.
USPTO; Notice of Allowance dated May 21, 2019 in U.S. Appl. No. 15/644,556.
USPTO; Non-Final Office Action dated May 30, 2019 in U.S. Appl. No. 16/114,531.
USPTO; Non-Final Office Action dated Jun. 14, 2019 in U.S. Appl. No. 14/197,517.
USPTO; Restriction Requirement dated Jun. 20, 2019 in U.S. Appl. No. 16/152,342.
USPTO; Non-Final Office Action dated Sep. 30, 2019 in U.S. Appl. No. 16/152,342.
USPTO; Notice of Allowance dated Aug. 28, 2019 in the U.S. Appl. No. 15/821,212.
USPTO; Restriction Requirement dated Jun. 11, 2019 in the U.S. Appl. No. 16/164,468.
USPTO; Notice of Allowance dated Oct. 31, 2019 in the U.S. Appl. No. 16/164,468.
USPTO; Non-Final Office Action dated Oct. 31, 2019 in the U.S. Appl. No. 16/103,562.
USPTO; Final Office Action dated Nov. 13, 2019 in the U.S. Appl. No. 15/367,961.
USPTO; Non-Final Office Action dated Nov. 21, 2019 in the U.S. Appl. No. 14/795,210.
USPTO; Notice of Allowance dated Dec. 11, 2019 in the U.S. Appl. No. 16/114,531.
USPTO; Non-Final Office Action dated Dec. 20, 2019 in the U.S. Appl. No. 16/164,468.
USPTO; Non-Final Office Action dated Dec. 31, 2019 in the U.S. Appl. No. 16/117,289.
USPTO; Non-Final Office Action dated Jan. 8, 2020 in the U.S. Appl. No. 15/821,212.
USPTO; Non-Final Office Action dated Jan. 10, 2020 in the U.S. Appl. No. 16/387,464.
USPTO; Notice of Allowance dated Mar. 9, 2020 in the U.S. Appl. No. 14/197,517.
USPTO; Notice of Allowance dated Jun. 18, 2020 in the U.S. Appl. No. 16/117,289.
USPTO; Final Office Action dated Mar. 26, 2020 in the U.S. Appl. No. 16/152,342.
USPTO; Advisory Action dated Jun. 5, 2020 in the U.S. Appl. No. 16/152,342.
USPTO; Notice of Allowance dated May 22, 2020 in the U.S. Appl. No. 14/795,210.
USPTO; Final Office Action dated Apr. 6, 2020 in the U.S. Appl. No. 16/103,562.
USPTO; Notice of Allowance dated Apr. 29, 2020 in the U.S. Appl. No. 16/164,468.
USPTO; Office Action dated Jun. 23, 2020 in the U.S. Appl. No. 15/367,961.
USPTO; Non-Final Office Action dated Jul. 9, 2020 in the U.S. Appl. No. 16/152,342.
USPTO; Notice of Allowance dated Jul. 21, 2020 in the U.S. Appl. No. 16/103,562.
USPTO; Notice of Allowance dated Aug. 19, 2020 in the U.S. Appl. No. 14/795,210.
USPTO; Final Office Action dated Jul. 20, 2020 in the U.S. Appl. No. 15/821,212.
USPTO; Final Office Action dated Jul. 24, 2020 in the U.S. Appl. No. 16/387,464.
USPTO; Notice of Allowance dated Oct. 1, 2020 in the U.S. Appl. No. 14/795,210.
USPTO; Notice of Allowance dated Oct. 16, 2020 in the U.S. Appl. No. 15/367,961.
USPTO; Advisory Action dated Oct. 19, 2020 in the U.S. Appl. No. 15/821,212.
USPTO; Non-Final Office Action dated Sep. 29, 2020 in the U.S. Appl. No. 16/483,004.
USPTO; Supplemental Notice of Allowance in the U.S. Appl. No. 16/103,562 dated Oct. 28, 2020.
USPTO; Non-Final Office Action dated Nov. 5, 2020 in the U.S. Appl. No. 16/206,675.
USPTO; Notice of Allowance dated Dec. 16, 2020 in the U.S. Appl. No. 16/387,464.
EP; Extended Search Report dated Sep. 17, 2015 in Application No. 15740208.2.
Sweden; Office Action dated Nov. 18, 2015 in Application No. 1551071-2.
EP; Supplemental Search Report dated Jun. 14, 2016 in Application No. 13859205.0.

(56) References Cited

OTHER PUBLICATIONS

EP; Supplemental Search Report dated Oct. 20, 2016 in Application No. 14760041.5.
EP; Extended Search Report dated Jan. 24, 2017 in Application No. 14760041.5.
EP; Supplemental Search Report dated Mar. 2, 2017 in Application No. 14826056.5.
EP; Extended Search Report dated Mar. 21, 2017 in Application No. 14846886.1.
MX; Examination Report dated Feb. 24, 2017 in Application No. 2015/006550.
MX; Examination Report dated Apr. 21, 2017 in Application No. 2015/011314.
JP; Examination Report dated Jul. 28, 2017 in Application No. 2015-545200.
CN; Examination Report dated Jul. 28, 2017 in Application No. 20138007041.5X.
CN; 2nd Examination Report dated Apr. 18, 2018 in Application No. 201380070415.X.
CN; Examination Report dated May 9, 2018 in Application No. 201480023946.8.
CN; 1st Office Action dated Nov. 20, 2018 in Application No. 201580016416.5.
CN; 1st Office Action dated Nov. 26, 2018 in Application No. 201480065117.6 (Received Jan. 25, 2019).
MX; 2nd Examination Report dated Oct. 24, 2017 in Application No. 2015/011314.
MX; 3rd Examination Report dated Jul. 2, 2018 in Application No. 2015/011314 (Received on Sep. 7, 2018).
EP; Supplemental Search Report dated Sep. 15, 2017 in Application No. 15740208.2.
MX; Office Action dated Jan. 23, 2018 in Application No. MX/a/2016/003798.
TW; Office Action dated Jan. 24, 2018 in Application No. 104102514.
TW; Notice of Allowance dated May 15, 2018 in Application No. 104102514.
EP; Extended Search Report dated Apr. 9, 2018 in Application No. 15848371.9.
EP; Supplementary Search Report dated Apr. 30, 2018 in Application No. 15848371.9.
EP; Extended Search Report dated Apr. 24, 2018 in Application No. 15819468.8.
JP; Office Action dated Aug. 2, 2017 in Application No. 2015-545200.
JP; Notice of Allowance dated Mar. 17, 2018 in Application No. JP 2015-545200.
JP; Office Action dated Feb. 2, 2018 in Application No. JP 2016-549317.
AU; 1st Office Action dated Apr. 13, 2018 in Application No. AU 2013352236.
EP; Extended Search Report and Supplementary Search Report dated Oct. 19, 2018 in Application No. EP 16762464.2.
AU; 1st Office Action dated Oct. 24, 2018 in Application No. AU 2015287705.
MX; 2nd Examination Report dated Oct. 04, 2018 in Application No. MX/a/2016/003798.
CN; 3rd Examination Report dated Oct. 31, 2018 in Application No. CN 201380070415.
CN; Notice of Intent to Grant dated Feb. 11, 2019 in Application No. CN 201380070415.
EPO; Examination Report dated Nov. 8, 2018 in Application No. EP 15740208.2.
AU; Examination Report dated Dec. 19, 2018 in Application No. AU 2014225864.
AU; 2nd Examination Report Mar. 20, 2019 in Application No. AU 2014225864.
EP; Notice of Intent to Grant dated Jan. 4, 2019 in Application No. EP14760041.5.
CN; Notice of Intent to Grant dated Jan. 30, 2019 in Application No. CN 201480023946.8.
EP; Examination Report dated Feb. 5, 2019 in Application No. EP 13859205.0.
JP; Notice of Allowance dated Dec. 30, 2018 in Application No. JP 2016-549317.
TW; Search Report dated Dec. 10, 2018 in Application No. TW 107119353.
TW; First Office Action dated Dec. 06, 2018 in Application No. TW 107119353.
EP; Examination Report dated Jan. 3, 2019 in Application No. EP 15848371.9.
MX; Notice of Allowance dated Mar. 7, 2019 in Application No. MX/a/2015/011314.
MX; 3rd Examination Report dated Mar. 21, 2019 in Application No. MX/a/2016/003798.
CA; Office Action dated Nov. 23, 2018 in Application No. CA 2892664.
CA; 2nd Office Action dated Feb. 14, 2019 in Application No. CA 2892664.
AU; Examination Report dated Feb. 8, 2019 in Application No. AU 2015328723.
RU; Examination Report dated Jan. 31, 2019 in Application No. RU 2017113541.
EP; Examination Report dated Apr. 18, 2019 in Application No. EP 15819468.8.
JP; Examination Report dated May 8, 2019 in Application No. 2017-518492.
MX; Examination Report dated Jun. 19, 2019 in Application No. MX/a/2017/004463.
MX; Examination Report dated May 27, 2019 in Application No. MX/a/2016/000616.
Sweden; Office Action dated Jul. 17, 2019 in Application No. 1551071-2.
CN; Second Office Action dated Apr. 29, 2019 (Received from foreign counsel on May 28, 2019) in Application No. 201480065117.6.
CN; Third Office Action Dated Aug. 8, 2019 in Application No. 201480065117.6.
MX; Mexican Notice of Allowance dated Oct. 14, 2019 in Application No. MX/a/2016/003798.
UAE; First Examination Report dated Nov. 19, 2019 in the Application No. UAE/P/0698/2015.
EP; European Notice of Intent to Grant in the Application No. 15740208.2-1215 dated Nov. 27, 2019.
CN; Chineese Decision to Grant Patent in the Application No. 201580016416.5 dated Dec. 31, 2019.
CN; Decision on Rejection in the Application No. 201480065117.6 dated Dec. 18, 2019.
CA; Canadian Office Action in the Canadian Application No. 2937810 dated Jan. 30, 2020.
CA; Second Canadian Office Action in the Canadian Application No. 2937810 dated Aug. 19, 2020.
CA; Notice of Allowance in the Canadian Application No. 15740208.2 dated Apr. 17, 2020.
CA; Canadian Office Action in the Canadian Application No. 2903830 dated Mar. 10, 2020.
CN; Chinese First Office Action in the Application No. 201680026247.8 dated May 29, 2020.
Kr; Korean first Office Action Preliminary Rejection dated Sep. 13, 2020 in Application No. 1020207011214.
Kr; Notice on Preliminary Rejection first Office Action dated Oct. 3, 2020 Application 1020177011784.
NZ; New Zealand Office Action dated Jul. 14, 2020 in the Application No. 730674.
CN; Chinese Second Office Action dated Aug. 24, 2020 in the Application No. 201580065117.0.
IN; Indian Office Action dated Sep. 17, 2020 in the Application No. 201717014878.
EP; European Examination Report dated Apr. 8, 2020 in the EP Application No. 15819468.8.
JP; Japanese Office Action dated Sep. 4, 2020 in the JP Application No. 2017501297.
BR; First Brazilian Office Action dated Aug. 16, 2020 in the BR Application No. BR112017000514-0.

(56) References Cited

OTHER PUBLICATIONS

CN; Chinese Third Office Action dated Sep. 4, 2020 in the CN Application No. 201580047461.7.
EP; European Examination Report dated Jun. 8, 2020 in the EP Application No. 17874082.5.
EP; European Search Report dated Jul. 31, 2020 in the EP Application No. 18748348.2.
AU; Australian Examination Report dated Aug. 4, 2020 in the AU Application No. 2019257398.
CN; Chinese Second Office Action dated Jun. 4, 2019 in the CN Application No. 201580016416.6.
EP; European Examination Search Report dated Oct. 6, 2020 in the EP Application No.
EP; European Notice of Publication in the EP Application No. 18882373.6 dated Sep. 9, 2020.
EP; European Extended Search Report in the EP Application No. 18748348.2 dated Nov. 4, 2020.
KR; Korean Notice of Allowance in the KR Application No. 9-5-2020-075537678 dated Nov. 1, 2020.
EP; European Search Report dated Oct. 1, 2020 in the EP Application No. 20174067.7.
EP; Extended Search Report dated Nov. 4, 2020 in EP 18748348.2.
PCT; International Search Report dated Jul. 4, 2014 in Application U.S. 2014/020624.
PCT; Written Opinion dated Jul. 4, 2014 in Application U.S. 2014/020624.
PCT; International Preliminary Report on Patentability dated Sep. 8, 2015 in Application No. U.S. 2014/020624.
PCT; International Search Report dated Nov. 13, 2014 in Application No. U.S. 2014/047054.
PCT; Written Opinion dated Nov. 13, 2014 in Application No. U.S. 2014/047054.
PCT; International Preliminary Report on Patentability dated Jan. 19, 2016 in Application No. U.S. 2014/047054.
PCT; International Search Report dated Jan. 6, 2015 in Application No. U.S. 2014/058126.
PCT; Written Opinion dated Jan. 6, 2015 in Application No. U.S. 2014/058126.
PCT; International Search Report dated Mar. 5, 2014 in Application No. U.S. 2013072089.
PCT; Written Opinion dated Mar. 5, 2015 in Application No. U.S. 2013/072089.
PCT; International Preliminary Report on Patentability dated Jun. 2, 2015 in Application No. U.S. 2013/072089.
PCT; International Search Report dated Apr. 24, 2015 in Application No. U.S. 2015/012063.
PCT; Written Opinion dated Apr. 24, 2015 in Application U.S. 2015/012063.
PCT; International Search Report and Written Opinio dated Oct. 6, 2015 in Application No. U.S. 2015/036801.
PCT; International Search Report and Written Opinion dated Nov. 2, 2015 in Application No. U.S. 2015/039797.
PCT; International Preliminary Report on Patentability dated Apr. 14, 2016 in Application No. U.S. 2014/058126.
PCT; International Search Report and Written Opinion dated Jul. 11, 2016 in Application No. U.S. 2016/021627.
PCT; International Search Report and Written Opinion dated Mar. 20, 2017 in Application No. U.S. 2016/064744.
PCT; International Search Report and Written Opinion dated Feb. 20, 2018 in Application No. US/2017/063061 (received May 31, 2018).
PCT; International Search Report and Written Opinion dated Aug. 09, 2018 in Application No. PCT/US2018/016610.
PCT; International Search Report and Written Opinion dated Oct. 12, 2018 in Application No. PCT/US2018/037643 (Received Dec. 20, 2018).
PCT; International Search Report dated Feb. 12, 2019 in Application No. PCT/US2019/056562 (Received Apr. 25, 2019).
PCT; Written Opinion dated Feb. 12, 2019 in Application No. PCT/US2019/056562 (Received Apr. 25, 2019).
PCT; International Preliminary Report on Patentability dated Jan. 19, 2017 in the International Application No. PCT/US2015/039797.
PCT; International Preliminary Report on Patentability dated Aug. 15, 2019 in the International Application No. PCT/US2018/016610.
PCT; International Search Report and Written Opinion dated Mar. 22, 2019 in the International Application No. PCT/US2018/063468 (68956.03816).
PCT; International Search Report and Written Opinion dated Aug. 9, 2019 in the International Application No. PCT/US2019/027993.
PCT; International Preliminary Patentability Report dated Oct. 29, 2020 in PCT/US2019027993.
PCT; International Preliminary Report on Patentability dated Dec. 26, 2019 in PCT/US2018/037643.
Kim, Young-Gon, and Moon-Seog Jun. A design of user authentication system using Qr code identifying method, Computer Sciences and Convergence Information Technology (ICCIT) 6th International Conference on IEEE. Nov 29-Dec 1, 2011.
Application Programming Interface by David Orenstein published Jan. 10, 2000 on Computerworld. com.
Gerd Kortuem et al., 'Architectural Issues in Supporting Ad-hoc Collaboration with Wearable Computers,' in: Proceedings of the Workshop on Software Engineering for Wearable and Pervasive Computing at the 22nd International Conference on Software Engineering, (2000).
3rd party observation dated Dec. 22, 2015 against Patent Application no. 1551071-2 in Sweden.
Revault Product Data Sheet dated Mar. 19, 2015.
Dusk Jockeys; Dust Jockeys Android Apps dated Mar. 7, 2012, pgs. 1-5.
Sue White: Wi-Fi and Bluetooth Coexistence, Electronic Component News, Mar. 2, 2012, pp. 1-7, XP05504386, Retrieved from Internet: URL: https://www.ecnmag.com/article/2012/03/wi-fi-andbluetooth-coexistence [retrieved on Sep. 6, 2017].
"Class Persistent Manager," doc/catalina/docs/a https://web.archive.org/web/20131110042918/https://tomcat.apache.org/tomcat-4.1-pi/org/apache/catalina/session, 3 Pages. (Oct. 2018).
Rico Fabio et al., "A Testbed for Developing, Simulating and Experimenting Multipath Aggregation Algorithms," Proceedings of the 2014 IEEE Emerging Technology and Factory Automation (ETFA), IEEE, pp. 1-4, (Sep. 2014).
X Autohaux, "Keyless Entry System", URL:https://images-na.ssl-images-amazon.com/images/I/9IncMVRWOSL.pdf [retrieved on Jul. 22, 2020].

\* cited by examiner

```
                                    400 mBroadcastingSocket = new Socket(AddressFamily.InterNetwork,
SocketType.Dgram, ProtocolType.Udp);
      mBroadcastingSocketEventArgs = new SocketAsyncEventArgs();         410
      mBroadcastingSocket.Ttl = 255;

var broadcastaddress = GetBroadcastAddress();
      mBroadcastingSocketEventArgs.RemoteEndPoint = new
IPEndPoint(broadcastaddress, UDPPort);

// Send the IP address we are listening on
      string packetData = JsonConvert.SerializeObject(LocalClient);
      byte[] payload = Encoding.UTF8.GetBytes(packetData);              420
      mBroadcastingSocketEventArgs.SetBuffer(payload, 0, payload.Length);

// Make an asynchronous Send request over the socket
      mBroadcastingSocket.SendToAsync(mBroadcastingSocketEventArgs);

mDiscoverySocket = new DatagramSocket();
      // This is the TTL but on datagram socket the default of 128 is more than
enough
      mDiscoverySocket.Control.OutboundUnicastHopLimit = 255;           430
      mDiscoverySocket.MessageReceived += DiscoverySocketNewMessage;

Await mDiscoverySocket.BindServiceNameAsync(UDPPort.ToString()); // Port
      mDiscoverySocket.JoinMulticastGroup(new HostName(MULTICAST_ADDRESS));

var writer = new DataWriter(await
socket.GetOutputStreamAsync(eventArguments.RemoteAddress,
eventArguments.RemotePort));
      await writer.StoreAsync();

var reader = eventArguments.GetDataReader();
      var data = new byte[reader.UnconsumedBufferLength];               440
      reader.ReadBytes(data);

// Get info from it
      var userDetails =
JsonConvert.DeserializeObject<IDiscoveredClient>(Encoding.UTF8.GetString(data, 0,
data.Length));
```

/// <summary>
    /// The broadcast message coming from a device that can be discovered
    /// </summary>
    public interface IDiscoveredClient
    {
        /// <summary>
        /// The name of the device (such as Windows Phone 8, iPhone 5 etc...)
        /// </summary>
        string DeviceName { get; set; }                                          ⎱ 510

/// <summary>
        /// The IP address where this device can be reached
        /// </summary>
        string ImagePath { get; set; }                                           ⎱ 520

/// <summary>
        /// The name of the owner of the device (such as the email account or
computer username)
        /// </summary>
        string Username { get; set; }                                            ⎱ 530

/// <summary>
        /// The devices endpoint (IP or name)
        /// </summary>
        string Endpoint { get; set; }                                            ⎱ 540

/// <summary>
        /// The transport layer (such as Bluetooth, NFC, WFD, PDQ) that this
client was discovered on
        /// </summary>
        string TransportLayer { get; set; }                                      ⎱ 550
    }
```

/// <summary>
/// The broadcast message coming from a device that can be discovered
/// </summary>
public interface IFileTransferRequest
{
    /// <summary>
    /// The client wishing to share the file with you
    /// </summary>
    IDiscoveredClient Client { get; set; }                              } 610

/// <summary>
    /// The filename of the file wanting to be sent
    /// </summary>
    string Filename { get; set; }                                       } 620

/// <summary>
    /// The size of the file wanting to be sent
    /// </summary>
    long Filesize { get; set; }                                         } 630

/// <summary>
    /// The client that will be receiving the file from you
    /// </summary>
    IDiscoveredClient ReceivingClient { get; set; }                     } 640

/// <summary>
    /// The unique ID for this file transfer
    /// </summary>
    Guid UniqueID { get; set; }                                         } 650

/// <summary>
    /// The transport layer associated with this request
    /// </summary>
    string TransportName { get; set; }                                  } 660
}
```

FIG. 6

```
/// <summary>
/// The response from a file transfer request
/// </summary>
public interface IFileTransferResponse
{
    /// <summary>
    /// The response from the user
    /// </summary>
    bool Response { get; set; }

/// <summary>
    /// The unique ID for this file transfer
    /// </summary>
    Guid UniqueID { get; set; }
} public interface IFileReceivedConfirmation
{
    bool Response { get; set; }
    Guid UniqueID { get; set; }
}
```

PORTABLE STORAGE DEVICE WITH MODULAR POWER AND HOUSING SYSTEM

CROSS-REFERENCE TO RELATED APPLICATIONS

This application is a continuation of and claims priority to U.S. patent application Ser. No. 15/644,556 filed on Jul. 7, 2017, and entitled "PORTABLE STORAGE DEVICE WITH MODULAR POWER AND HOUSING SYSTEM," which is a continuation in part of and claims priority to U.S. patent application Ser. No. 14/745,100 filed on Jun. 19, 2015, and entitled "SYSTEMS AND METHODS FOR PORTABLE STORAGE DEVICES" (Now U.S. Pat. No. 10,123,153) which claims priority to U.S. Provisional Patent Application No. 62/060,379 filed on Oct. 6, 2014, and entitled "SYSTEMS AND METHODS FOR PORTABLE STORAGE DEVICES." U.S. patent application Ser. No. 15/644,556 filed on Jul. 7, 2017, also claims priority to U.S. Provisional Patent Application No. 62/520,336 filed on Jun. 16, 2017, and entitled "PORTABLE STORAGE DEVICE WITH MODULAR POWER AND HOUSING SYSTEM," the contents of each of the foregoing applications are incorporated by reference herein in their entirety.

FIELD

The present disclosure generally relates to portable storage devices, and more particularly to portable storage devices with modular components.

BACKGROUND

Communication between devices is typically performed over a network, such as the internet or a local area network. However, networks may not always be available for communication between devices and additionally may expose communications to security breaches on the network. Devices enabled with Bluetooth® may communicate directly. However, Bluetooth® enabled devices must be within a limited range, and communication speeds may be relatively slow. Consumers may have files stored on one device and wish to access the files from another device. It may be difficult to transfer the file without an internet connection or using data on a data plan. Additionally, transferring the information may expose the information to hackers and security breaches.

Carrying storage devices can also be cumbersome even without concerns regarding data transfer. Most people are conditioned to check for a few items such as their keys, wallets, and phones when leaving a location. But USB sticks, for example, are easily misplaced and left behind. Losing storage devices is a security risk in addition to being inconvenient. Physical copies of data retained on a storage device get exposed when the device is recovered by a third party.

SUMMARY

A modular portable storage system is disclosed herein. The modular portable storage system includes a portable storage device with a housing having a cuboid geometry. The housing retains a processor, a storage module in electronic communication with the processor, and a wireless communication module. A circuit may communicate electronically with the portable storage device. The portable storage device may be removably coupled to the circuit board. A power supply may be in electronic communication with the circuit board. The power supply may also be removably coupled to the circuit board. The portable storage device and the power supply may be removably retained within the external housing. The circuit board may be mechanically coupled to the external housing.

In various embodiments, the portable storage device may further include a data port exposed from a first surface of the portable storage device. The portable storage device may also include conductive pads exposed from the first surface of the portable storage device. The data port may be disposed between at least two of the conductive pads. A case for a mobile device may define a cavity configured to retain the portable storage device. The case may further include an interface disposed in the cavity and configured for electronic coupling to at least one of the conductive pads or the data port. The case may also comprise a data plug in electronic communication with the interface and configured to engage a plug on the mobile device. The case may have a protrusion configured to house the cavity and/or the power supply.

A modular portable storage system may also include a portable storage device comprising a housing having a cuboid geometry. The housing may retain a processor, a storage module in electronic communication with the processor, and a wireless communication module. An electronic interface panel may be located on a surface of the portable storage device. The electronic interface panel may include a data port and/or a conductive pad. A case for a mobile device may include a cavity to retain the portable storage device.

In various embodiments, the cavity may have five orthogonal surfaces. The portable storage device may lay flush with an interior surface of the case in response to the portable storage device being inserted into the cavity. The case may further include an interface disposed in the cavity and electronically coupled to the electronic interface panel. The case may include a data plug in electronic communication with the interface and configured to engage a plug on the mobile device. The case may also comprise a protrusion disposed at an external surface and configured to house the cavity. The protrusion may be configured to house a power supply.

A portable storage device may include a processor, a circuit board coupled to the processor and in electronic communication with the processor, a non-transitory memory coupled to the circuit board and in electronic communication with the circuit board, a first wireless chip coupled to the circuit board and in electronic communication with the circuit board, wherein the first wireless chip may transmit data directly to a mobile device, a housing retaining the processor, the circuit board, the non-transitory memory, and the first wireless chip, wherein the housing is a cuboid defined by a height, a width, and a length.

In various embodiments, the height may be substantially 0.25 inches, the length may be substantially 2.4 inches, and the width may be substantially 1.75 inches. An electronic interface panel may be in electronic communication with the circuit board and disposed on a first surface of the portable storage device. The first surface may be defined by the height and the length of the portable storage device. A human interface panel may also be defined in a second surface with a button and/or a light source. The second surface may be defined by the length and the width of the portable storage device.

BRIEF DESCRIPTION OF THE DRAWINGS

A more complete understanding may be derived by referring to the detailed description and claims when considered in connection with the Figures, wherein like reference numbers refer to similar elements throughout the Figures.

FIG. 4 illustrates a discovery protocol according to various embodiments;

FIG. 5 illustrates a definition for a discovery protocol according to various embodiments;

FIG. 6 illustrates a definition for a file transfer request according to various embodiments;

FIG. 7 illustrates a definition for a response to a file transfer request according to various embodiments;

DETAILED DESCRIPTION

Figure 1:
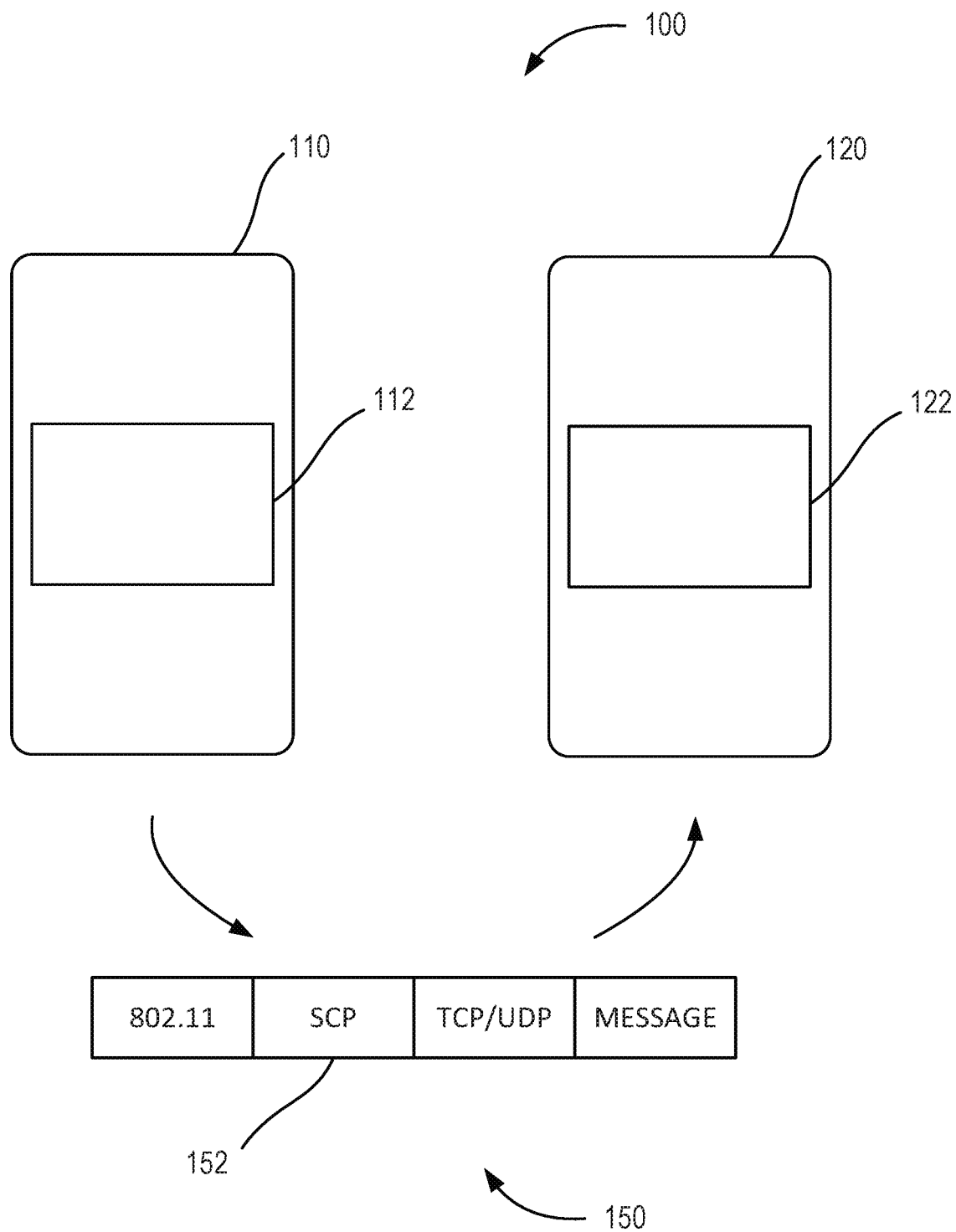
FIG. 1 illustrates a schematic diagram of a system for transmitting messages according to various embodiments of the disclosure.

The detailed description of exemplary embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

The present disclosure relates to systems, methods, and computer program products. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described. After reading the description, it will be apparent to one skilled in the relevant art(s) how to implement the disclosure in alternative embodiments.

Systems and methods are disclosed herein for communication between a portable content repository and computing devices. A portable storage device may serve as a content repository by retaining content for access by other devices. Various computing devices may read, write, and/or execute content stored on the portable storage device. Although the portable storage device may "permanently" store the content, the various computing devices accessing content on the portable storage device retain the content temporarily and/or with access controls in place. The portable storage device may thus be described as a content repository device. Content repository devices of the present disclosure may use a standardized communication system ("SCS") as described herein. The portable storage device may also be reconfigurable relative to various components The systems and methods disclosed herein may enable communication between devices without connection to the Internet or other networks using an SCS. An SCS may be operable on the computing devices of the present disclosure. The SCS may comprise any combination of hardware and/or software. The SCS may utilize existing physical components of the device, such as 802.11 or 802.2(2) wireless chips and Bluetooth® systems in order to communicate with other devices. The SCS may be suitable for any communication protocol, such as IP, TCP/UDP, Bluetooth®, raw Manchester encoding, and any other form of wireless communication.

The SCS may allow communication between devices of varying types and platforms. Additionally, as communication may happen directly between devices without transmitting data across a network, communication may be available when networks are unavailable, and communications may be protected from eavesdroppers on a network. Furthermore, direct communication between devices may avoid data charges on cellular data plans.

Referring to FIG. 1, a system 100 for transmitting messages is illustrated according to various embodiments. A first device 110 comprising an SCS 112 and a second device 120 comprising an SCS 122 are illustrated according to various embodiments. In various embodiments, SCS 112 and SCS 122 may be aftermarket software programs installed on first device 110 and second device 120. For example, a user may download an SCS app onto a smartphone or other device. However, in various embodiments, SCS 112 and SCS 122 may be embedded into a chip, such as an 802.11 wireless chip, in first device 110 and/or second device 120.

In various embodiments, the SCS may implement a standardized communication protocol ("SCP") on a device. The SCP may attach an SCP header 152 to a packet in order to identify a datagram 150 as an SCP datagram. First device 110 may communicate with second device 120 via SCP. The SCS may recognize the SCP header and may follow the SCP. The SCP may define the ability for devices to discover one another, to request the transfer of raw data, to transmit confirmations on receipt of data, and to perform any other steps involved with transmitting data.

In various embodiments, the SCS may be implemented at the network layer in the Open Systems Interconnection ("OSI") model (or the Internet layer in the TCP/IP model). Regardless of the protocol being used at the transport layer (e.g. TCP, UDP, SCTP, DCCP), the SCP header may allow devices comprising an SCS to communicate via SCP.

In various embodiments, at least one of first device 110 and second device 120 may comprise a smartphone. However, in various embodiments, first device 110 and second device 120 may comprise any type of device capable of transmitting and/or receiving data.

Figure 2:
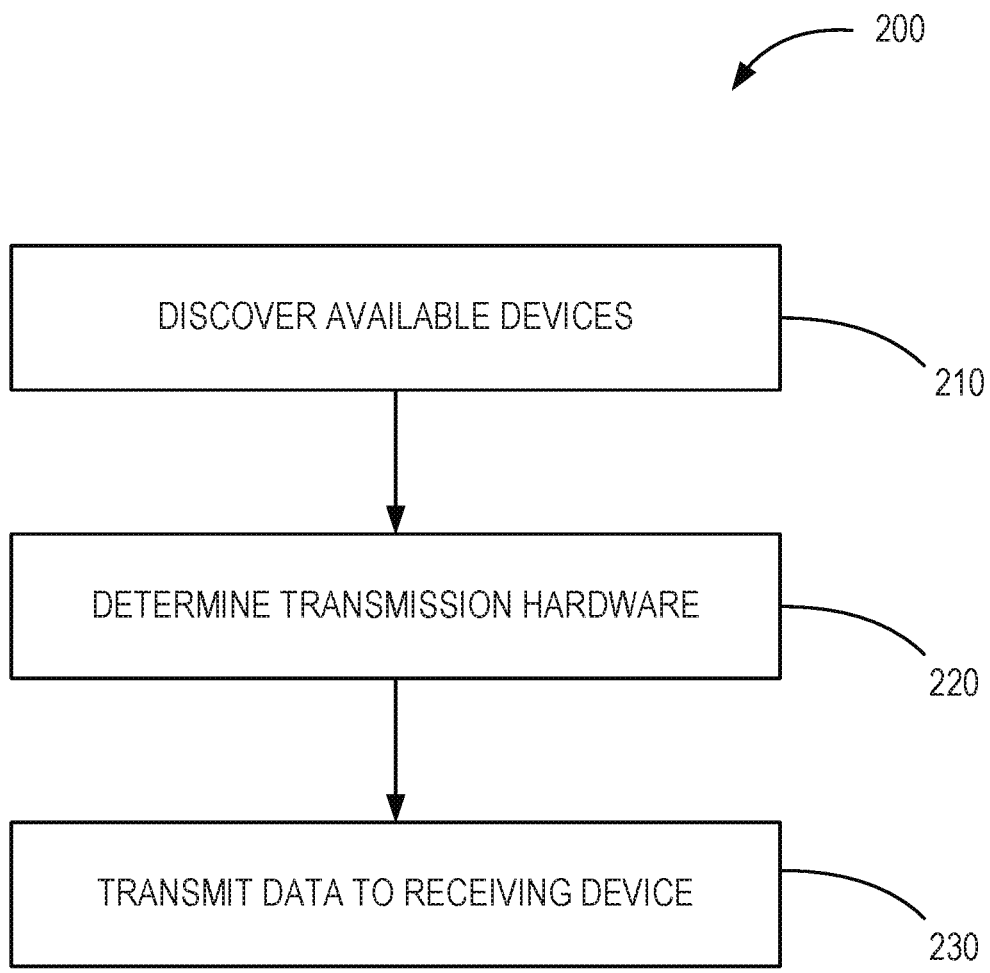
FIG. 2 illustrates a process for transmitting data between devices according to various embodiments.

Referring to FIG. 2, a process 200 for transmitting data between devices is illustrated according to various embodiments. In various embodiments, a first user may wish to transmit data from first device 110 to second device 120. The data may comprise any type of data, such as a text message, image, video, text document, or any other type of file.

First device 110 may discover available devices (step 210). First device 110 may attempt to discover other devices by a variety of methods. In various embodiments, first device 110 may discover other devices via a camera or other optical device. In various embodiments, second device 120 may display a symbol, such as a QR-code, a barcode, or text. The symbol may comprise identifying characteristics about second device 120. For example, in various embodiments the identifying characteristics may comprise at least one of a device name, an IP address of the device, an owner name, an endpoint of the device, and the available transport layers on the device. First device 110 may scan the symbol using a camera. First device 110 may obtain the identifying characteristics from the symbol and use the identifying characteristics in order to transmit data to second device 120.

In various embodiments, the SCS on first device 110 may search for other devices using a wireless chip in first device 110. Devices comprising an SCS may transmit a broadcast message. The broadcast message may comprise the identifying characteristics of the device. In various embodiments, first device 110 may be within transmission range of second device 120. The transmission range may depend on the specific type of wireless chips in first device 110 and second device 120. However, in various embodiments, the transmission range may be up to about 200 feet-300 feet. The SCS may open a socket on first device 110 to listen for broadcast messages. The broadcast message may be sent by a variety of hardware. For example, the broadcast message may be transmitted via an 802.11 wireless chip, Bluetooth® chip, or NFC.

In various embodiments, first device 110 and second device 120 may not be within transmission range of each other. However, an intermediary device, such as a smartphone equipped with hotspot technology, may be within transmission range of first device 110. First device 110 may search for available devices by transmitting a message to intermediary device, instructing intermediary device to look for available devices. Intermediary device may receive a broadcast message from second device 120, and intermediary device may transmit the broadcast message to first device 110. Thus, first device 110 may discover second device 120 without connecting to the internet or a cellular network even though first device 110 may not be within transmission range of second device 120. In various embodiments, any number of intermediary devices may be daisy-chained, such that first device 110 may discover second device 120 from miles apart by transmitting data via a series of intermediary devices.

First device 110 may display a list of all discovered devices to the user. The user may select second device 120 in order to transmit data to second device 120. The user may select a file or message to be transmitted to second device 120.

The SCS 112 on first device 110 may determine the transmission hardware to utilize for the transmission (step 220). In various embodiments, first device 110 and second device 120 may each have only one type of transmission hardware, such as an 802.11 wireless chip, and the SCS 112 may thus select the 802.11 wireless chip to transmit the data. However, in various embodiments, multiple transmission paths may be available between first device 110 and second device 120. For example, first device 110 and second device 120 may each comprise an 802.11 wireless chip and a Bluetooth® chip. In various embodiments, the SCS 112 may determine the fastest transmission path, and may select the fastest transmission path to transmit the data. In various embodiments, the transmission path may be selected by default settings. For example, SCS 112 may always select an 802.11 wireless path for transmission when available, and if the 802.11 wireless path is not available, SCS 112 may select a Bluetooth® path. However, in various embodiments, the SCS 112 on first device 110 may transmit a speed test message to second device 120 via each available transmission path, and the SCS 112 may select the fastest transmission path based on the speed test results.

In various embodiments, the SCS 112 may instruct first device 110 to send the data to second device 120 via multiple transmission paths. A message may be divided into multiple packets. SCS 112 may analyze the available transmissions paths, and send the message over multiple transmission paths in order to expedite transmission of the entire message. For example, SCS 112 may determine that the fastest method of transmitting the message may be to transmit 90% of the packets via an 802.11 wireless path, and 10% of the packets over a Bluetooth® path. SCS 112 may attach an SCP header to each packet being transmitted to second device 120, whether via 802.11 wireless or Bluetooth®. Thus, SCS 122 on second device 120 may recognize the packets as being received by SCP, and SCS 122 may reassemble the packets in order to recreate the entire message. In various embodiments, SCS 112 may analyze all transmission paths available, including but not limited to multiple 802.11 wireless chips, Bluetooth® chips, NFC, PDQ, or any other transmission paths in order to select the fastest transmission method. The SCS on first device 110 may initiate a file send protocol and transmit the data to second device 120 (step 230).

In various embodiments, first device 110 and second device 120 may be connected to the same local network. First device 110 may transmit a link, such as a QR-code, over a cellular network or the local network to second device 120. In various embodiments, the link may comprise 10 kb or less of data. Second device 120 may use the link to request or accept a file transfer. First device 110 may transmit a file over the local network. In various embodiments, the file may be transferred using TCP/IP directly over the local network.

In various embodiments, second device 120 may have access to an internet connection. First device 110 may transmit a link over a cellular transmission path to second device 120, and second device 120 may use the link to download a file stored on the cloud and/or on a server over the internet. In various embodiments, second device 120 may download the file using TCP/IP.

In various embodiments, first device 110 may sync its contents with a cloud database. In various embodiments, first device 110 may comprise an SCS folder, and only files stored in the SCS folder may be synced with the database. First device 110 may transmit a link over a cellular transmission path to second device 120 identifying a file stored on the database. In various embodiments, second device 120 may not have access to an 802.11 wireless network at the time second device 120 receives the link. Second device 120 may use the link to access the file whenever second device 120 gains access to an 802.11 wireless network in order to prevent cellular data charges. In various embodiments, second device 120 may use the link to access the file over the cellular network. In various embodiments, second device 120 may stream all or part of the file over either the cellular network or an 802.11 wireless network.

In various embodiments, first device 110 may share an online folder with second device 120. First device 110 may indicate that second device 120 may have access to an online folder. First device 110 may sync with the online folder to upload files stored on first device 110 to the online folder. Second device 120 may sync with the online folder to download files stored in the online folder to second device 120.

Figure 3:
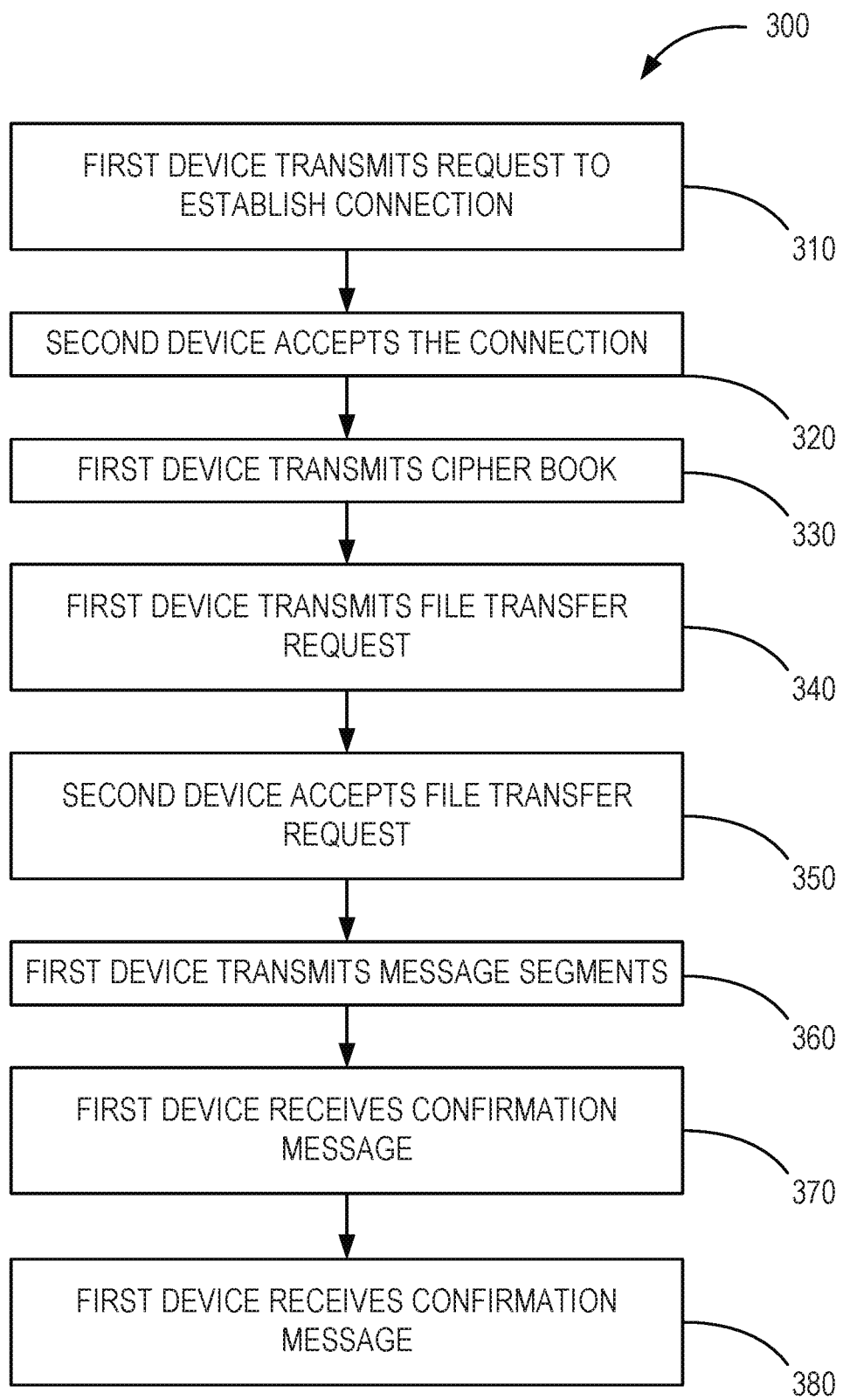
FIG. 3 illustrates a process for a file send protocol according to various embodiments.

Referring to FIG. 3, a process 300 for a file send protocol is illustrated according to various embodiments. First device 110 may transmit a request to establish a connection with second device 120 (step 310). In various embodiments the connection may comprise a TCP connection. However, in various embodiments, the connection may comprise any type of connection for transmitting data between devices. Second device 120 may accept the connection request (step 320). In various embodiments, the connection may be between secure sockets on first device 110 and second device 120.

In various embodiments, first device 110 may transmit a message comprising a cypher book to second device 120 (step 330). The cypher book may comprise a list of one-time cyphers, and may allow second device 120 to decrypt data sent to second device 120 over the secure socket connection using one time cyphers. In various embodiments, first device 110 may encrypt the message comprising the cypher book using known encryption methods, such as Advanced Encryption Standard ("AES") or RSA encryption. However, subsequent messages during the transfer session may be encrypted using the one-time cyphers contained in the cypher book. The messages encrypted using the one-time cyphers may be encrypted and decrypted using significantly less processing power and time than messages encrypted with AES or RSA. Additionally, the messages sent using the one-time cyphers may be indecipherable to parties not containing the cypher book.

First device 110 may send a file transfer request (step 340). For an example of a file transfer request, refer to FIG. 5. Second device 120 may accept the file transfer request (step 350). In response to second device 120 accepting the file transfer request, first device 110 may break the file into segments, and begin transmitting the segments to second device 120 (step 360). After first device 110 has transmitted all segments of the file, first device 110 may wait for confirmation that second device 120 has received all segments. Second device 120 may transmit a confirmation message to first device 110 indicating that all segments have been received (step 370). Second device 120 may decrypt and reassemble the segments according to SCP in order to recreate the file (step 380).

Referring to FIG. 4, an example of a discovery protocol 400 is illustrated according to various embodiments. Discovery protocol 400 may be implemented on the transport layer using TCP/UDP. However, in various embodiments, discovery protocols may be implemented using a Bluetooth® serial port, RS-232, or may be sent entirely over datagrams or a Windows® Socket API ("WSA"). The Local-Client in the illustrated embodiment may be a new instance of an IDiscoveredClient (defined in FIG. 5) class filled in with the device's identifying characteristics, such as device name, user name, preview image, and endpoint (in this case an IP address and port). First device 110 may open a new socket for a broadcast message (410). First device 110 may transmit the IP address that first device 110 is listening on for a response to the broadcast message (420). First device 110 may open a new datagram socket to listen for a response message (430). After receiving a response message, first device 110 may decipher the response message into the original IDiscoveredClient message that first device 110 sent (440).

Referring to FIG. 5, a definition for an example discovery protocol 500 is illustrated according to various embodiments. The definition may be a single common class called IDiscoveredClient that may be implemented by a transmitting device and a receiving device. In various embodiments, the definition may be expanded to include custom fields and any other information that users may desire. In various embodiments, the definition may comprise a name of the device (510), an IP address of the device (520), an owner of the device (530), an endpoint of the device (540), and a transport layer on which the device was discovered (550). However, one skilled in the art will appreciate that the particular fields used may be altered to any desired fields.

Referring to FIG. 6, a definition for an example file transfer request protocol 600 is illustrated according to various embodiments. The definition may be called "IFile-TransferRequest." In various embodiments, the definition may comprise the name of the device transmitting a file (610), the filename to be sent (620), the size of the file (630), the device receiving the file (640), a unique identification for the file transfer (650), and the transport layer associated with the file transfer (660).

Referring to FIG. 7, a definition for a response to a file transfer request 700 is illustrated according to various embodiments. The receiving device may respond with a definition called IFileTransferResponse to indicate that the receiving device is willing to accept the file transfer. In various embodiments, IFileTransferResponse may comprise the response from the user (710) and the unique identification for the file transfer (720). The transmitting device may receive the response from the receiving device, and the transmitting device may proceed to transmit the file to the receiving device. Once a complete file transfer has occurred, the receiving device may transmit a confirmation to the transmitting device (730).

Figure 8:
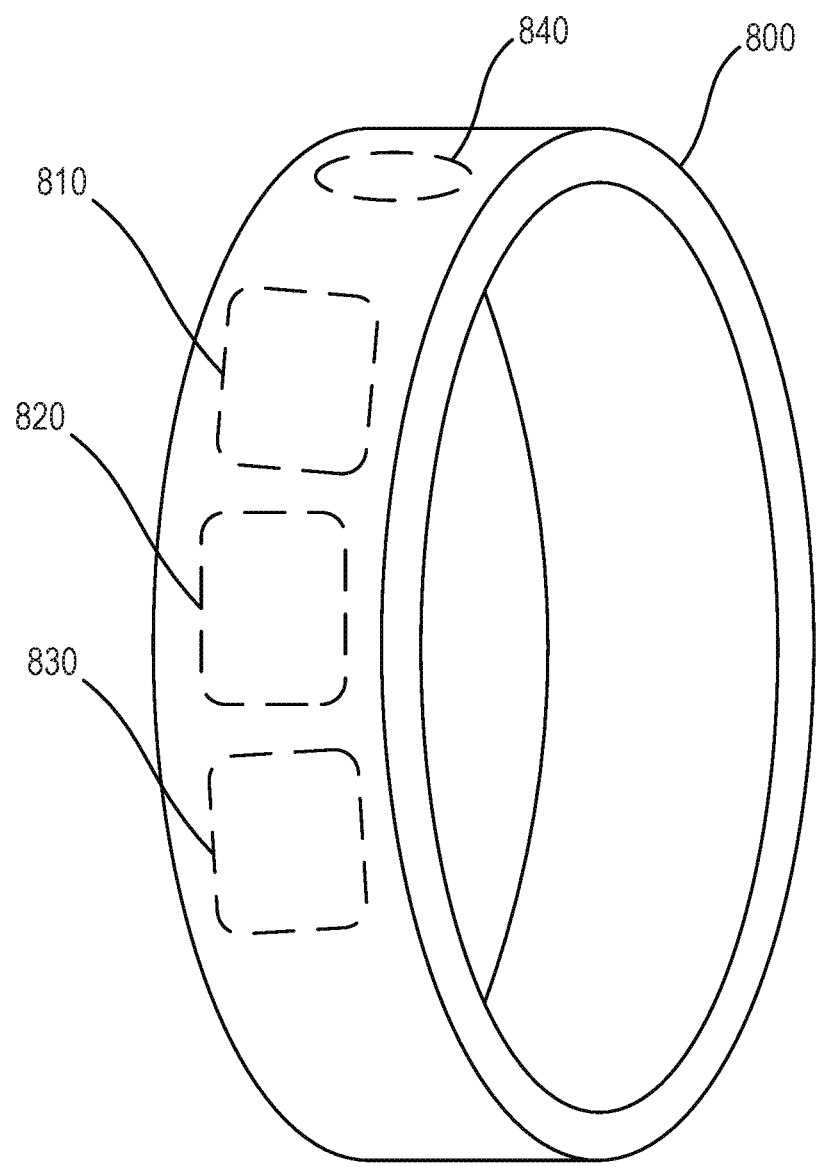
FIG. 8 illustrates a portable storage device according to various embodiments.

Referring to FIG. 8, a portable storage device ("PSD") 800 is illustrated according to various embodiments. The PSD 800 may be a wearable device, such as a wrist band or bracelet as illustrated in FIG. 8. However, PSDs may be any type of portable device which is capable of storing information. For example, a PSD may comprise a watch, necklace, phone case, smartphone, implanted chips, clothing item, wallet, etc.

The PSD 800 may comprise a storage module 810, a communication module 820, a processor 830, and a battery 840. The storage module 810 may comprise a memory card. For example, the storage module 810 may comprise an SD card, an xD card, a CompactFlash card, or any other suitable memory card. The storage module 810 may comprise an internal memory, such as iSSD, SSD, iNAND, or flash SD. The communication module 820 may comprise one or more components capable of wireless communication. For example, the communication module may comprise an 802.11 or 802.2(2) wireless chip, a Bluetooth® chip, an NFC chip, etc. The processor 830 may comprise any combination of hardware and/or software capable of providing instructions to the storage module 810 and the communication module 820. In various embodiments, the storage module 810, the communication module 820, and the processor 830 may be embedded within the PSD 800, such that the PSD 800 does not have any visible electronic components. In various embodiments, the PSD 800 may comprise a waterproof coating, such as rubber or silicone.

The PSD 800 may comprise a standard communication system ("SCS") as previously described herein. The SCS may be any combination of hardware and/or software which is capable of communicating via a standard communication protocol ("SCP") as previously described herein. In various embodiments, the SCS may be implemented on at least one of the storage module 810, the communication module 820, or the processor 830.

The PSD 800 may wirelessly receive and transmit files and communications from other devices, such as smartphones, televisions, game consoles, tablets, personal computers, printers, etc. Due to the SCS, the PSD 800 may not be limited to communicating with any particular brand or manufacturer of device. In contrast, the PSD 800 may communicate across platforms, such as with Apple® devices, Android® devices, Windows® devices, UNIX® devices, or any other suitable devices.

In various embodiments, the PSD 800 may allow a user to access their files wherever the user goes. For example, a user may have a document stored on a laptop computer. The user may transmit the document from the laptop computer to the PSD 800 using the SCS. The PSD 800 may store the document in the storage module 810. The user may then transmit the document from the PSD 800 to another device, such as a smartphone, using the SCS.

In various embodiments, the PSD 800 may communicate directly with other devices without using a network. Thus, information may be transmitted securely between the PSD 800 and other devices. However, in various embodiments, the PSD 800 may communicate over a network using a wireless chip in the communication module 820. The communication module 820 may comprise two wireless chips, allowing the PSD 800 to simultaneously communicate over a network on a first wireless chip and directly to another device on a second wireless chip.

In various embodiments, the PSD 800 may allow data to be transferred from a device to the PSD 800 without storing the data on the device. For example, a smartphone may capture a picture and transmit the picture directly to the PSD 800 using the smartphone's RAM without storing the picture on the hard drive of the smartphone. Thus, the smartphone may be lost, stolen, sold, or donated without risk of a third-party obtaining the picture, or other data which is stored on the PSD 800 and not the smartphone. Similarly, a user may initiate an SCS on a device, such as a laptop, and open a file stored on the PSD 800 using the device. The user may edit the file on the device and save the edited file directly on the PSD 800 without saving the edited file on the device.

A user may use the PSD 800 to store all of the user's files. Regardless of what device a user is using to access the files on the PSD 800, the user may create, edit, and delete files directly on the PSD 800 using another device, such as a personal computer.

In various embodiments, the PSD 800 may emulate a network drive. Thus, the PSD 800 may be able to communicate with devices which are not capable of downloading or installing custom software. For example, the PSD 800 may emulate a DLNA media service, or a Windows® network. The PSD 800 may require a password to be entered on the device, and the device may then access files stored on the PSD 800.

Figure 9:
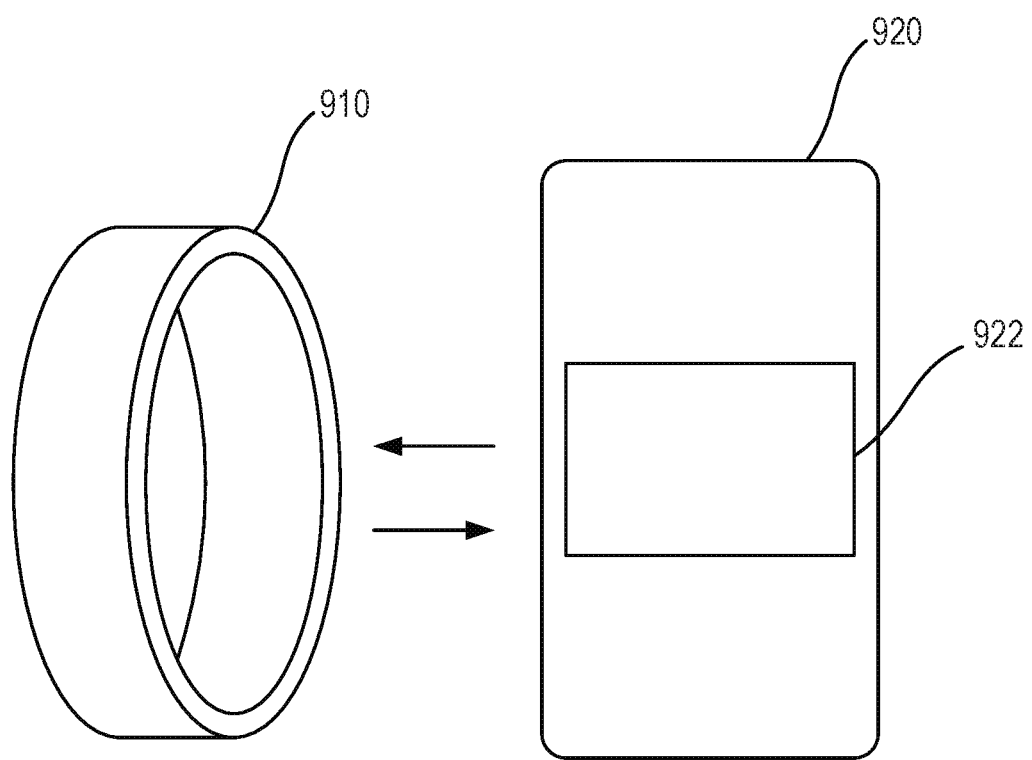
FIG. 9 illustrates a portable storage device communicating with a device according to various embodiments.

Referring to FIG. 9, a PSD 910 and a device 920 comprising an SCS 922 are illustrated according to various embodiments. In various embodiments, the device 920 may be the first device 110 described with reference to FIG. 1. However, the device 920 may comprise any device capable of communicating with the PSD 910 using an SCP. A user may login to the SCS 922, and the device 920 may request an access key. In various embodiments, the device 920 may request the access key from a server over an internet or cellular connection. However, in various embodiments, the PSD 910 may have one or more stored access keys on the PSD 910, and the device 920 may request the stored access key from the PSD 910. The PSD 910 may transmit the stored access key to the device 920, and the device 920 may use the stored access key to encrypt and/or decrypt data transmitted between the device 920 and the PSD 910. In various embodiments, the access key may be a temporary key which may expire after a set amount of time. The user may view the files stored on the PSD 910, and the user may upload or download files between the PSD 910 and the device 920. In various embodiments, the PSD 910 may stream a file, such as an audio or video file, to the device 920. Once a file is stored on the PSD 910, the user may access the file with any device within communication range of the PSD 910. In various embodiments, a file may be streamed cross-platform. For example, a user may purchase an audio file via iTunes® on an Apple® device. The user may transmit the audio file to the PSD 910 using the SCP. The PSD 910 may stream the audio file from the PSD 910 to a non-Apple® device, regardless of the operating system, using the SCP.

Figure 10:
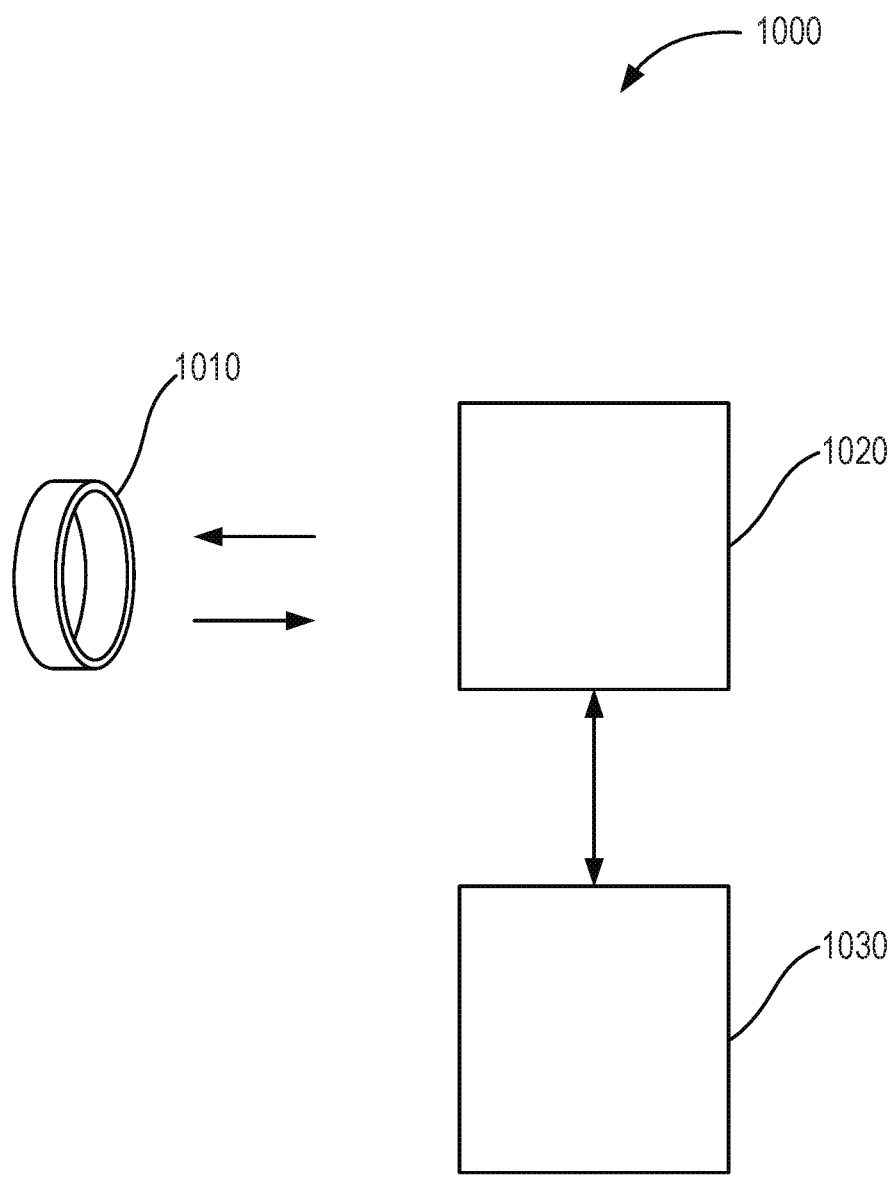
FIG. 10 illustrates a portable storage device syncing with a server according to various embodiments.

Referring to FIG. 10, a system 1000 for backing up data on a PSD 1010 is illustrated according to various embodiments. The PSD 1010 may establish a connection with a device 1020. In various embodiments, the device 1020 may comprise any type of device capable of communicating with a server 1030. For example, the device 1020 may comprise a personal computer, a smartphone, or a wireless router. The device 1020 may communicate with the server 1030 over a network. In various embodiments, the server 1030 may comprise a cloud computing system.

The device 1020 may comprise an SCS. The PSD 1010 may communicate with the device 1020 utilizing the SCS. A user may log into the SCS on the device 1020, and instruct the PSD 1010 to sync with the server 1030. The PSD 1010 may transmit any new or edited files to the server 1030 via the device 1020. The files may be associated with a user account and stored on the server 1030. In various embodiments, any new or edited files associated with the user account may be downloaded from the server 1030 and transmitted to the PSD 1010 via the device 1020. Once the PSD 1010 is synced with the server 1030, a user may access a file by either logging into the user account with any device over the internet, or the user may access the file by accessing the PSD 1010 with a device.

In various embodiments, the PSD 1010 may automatically sync when charging, and may charge wirelessly or on a charging cable. The PSD 1010 may reach a predefined battery level prior to initiating the sync. For example, when placed on a charger, the PSD 1010 may initiate a sync in response to the battery level reach at least 50%, or at least 90%. The PSD 1010 may sync to any location specified by a user, such as the server 1030, a local device, or another PSD.

With reference to FIGS. 11A-11E a portable storage device 1100 is shown with modular components, in accordance with various embodiments. Portable storage device 1100 may include features and functionality described herein. Portable storage device 1100 may have a housing 1102. Housing 1102 may be made from materials including metals, plastics, and/or rubbers. For example, housing 1102 may be made from stamped and fused sheets of aluminum, molded plastic, or other suitable materials. Housing 1102 may also be made from thermally conductive materials to enhance heat dissipation.

In various embodiments, housing 1102 may have rectangular cuboid geometry or rhomboid geometry with 6 sides. Each side may have dimensions substantially congruent to the side opposite each side's internal surface. In that regard, housing 1102 may comprise three pairs of sides having similar dimensions.

In various embodiments, the surfaces of housing 1102 may leave exposed various interfaces and components. For example, surface 1105 of housing 1102 may include electronic interface panel 1104. Electronic interface panel 1104 may further include conductive pads 1106 disposed slightly proud from, flush with, or slightly recessed from surface 1105. Conductive pads 1106 may form an electrical connection with conductive pins and/or conductive pads formed on an opposing surface in contact with or near to surface 1105.

In various embodiments, electronic interface panel 1104 may further comprise a data port 1108 exposed from housing 1102. Data port 1108 may be configured to transmit power and/or signals over electronic connections in a predetermined format. For example, data port 1108 may use a protocol such as USB, firewire, lightning cable, SATA, PCIe, or other suitable cable interface for data and/or power transfer. Data port 108 may also use a proprietary pin configuration and slot geometry.

Figure 11A:
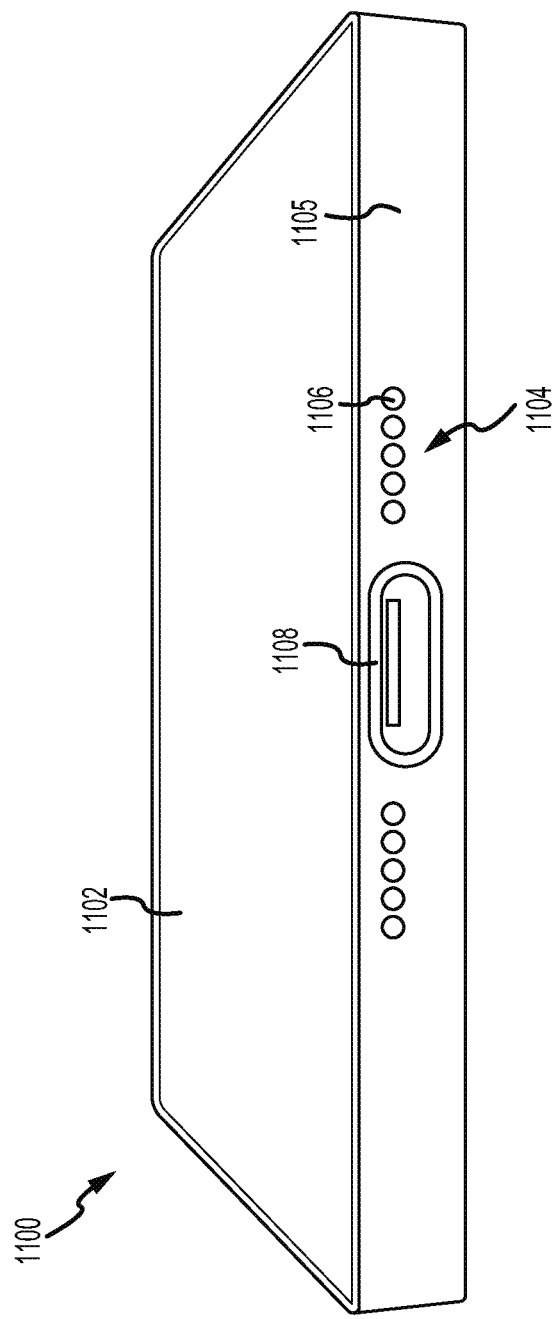
FIGS. 11A-11E illustrate a portable storage device suitable for electronic and mechanical coupling to various components in a modular portable storage system according to various embodiments.
Figure 11B:
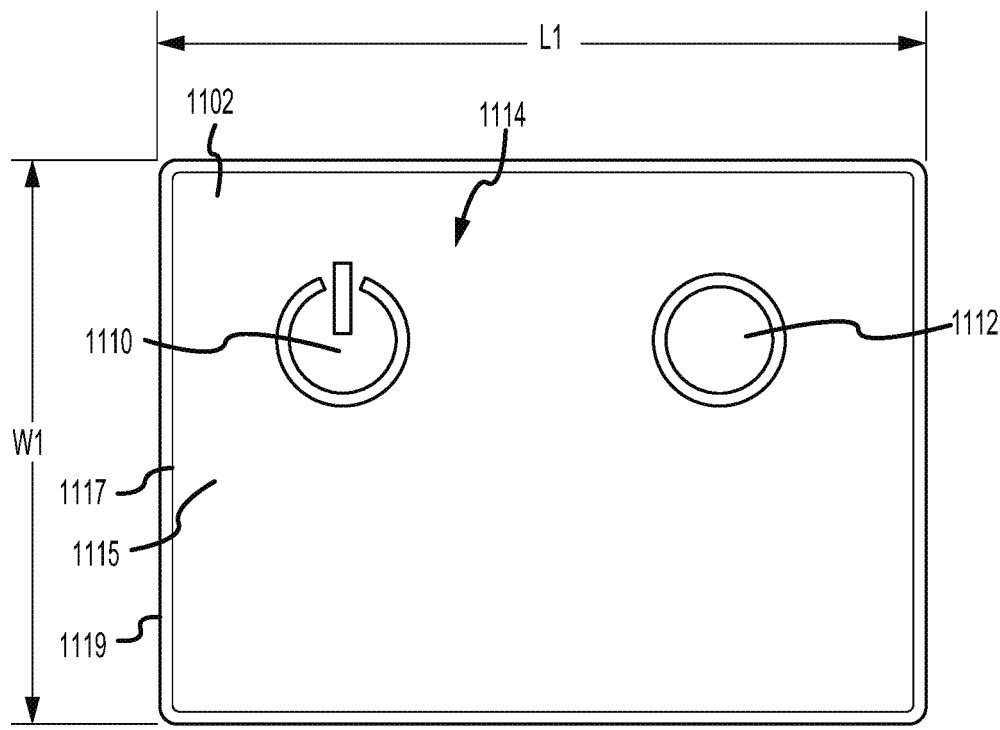

In various embodiments, housing 1102 may further include surface 1115 having a rectangular geometry as depicted in a top view by FIG. 11B. Surface 1115 may include human I/O interface 1114 comprising a power button and/or light source 1110 and an interface button and/or light source 1112. Lighting may come from a light emitting diode or other low energy consumption lighting source. Power button 1110 and interface button 1112 may comprise capacitive touch buttons, actuating buttons, or other input mechanisms suitable for touch control by a user. Housing 1102 may also retain a microphone or other I/O device in various embodiments so that users may thus interact with portable storage device 1100 using voice commands, for example.

In various embodiments, surface 1115 may have a width $W_1$ and a Length $L_1$. Width $W_1$ may be a length of substantially 1.75 inches, for example. Length $L_1$ may be a length of substantially 2.4 inches, for example. As used herein to describe a dimension, the term "substantially" describes a variance in the stated dimension of +/−5%, +/−10%, +/−15%, or +/−20%. Furthermore, the dimensions disclosed herein are given for exemplary purposes and are not intended to be limiting. The small dimensions of portable storage device 1100 may lend it to use in a modular storage and power solution described in greater detail below. The perimeter of surface 1115 as well as other surfaces of housing 1102 may be bounded by rounded edges 1119.

Figure 11C:
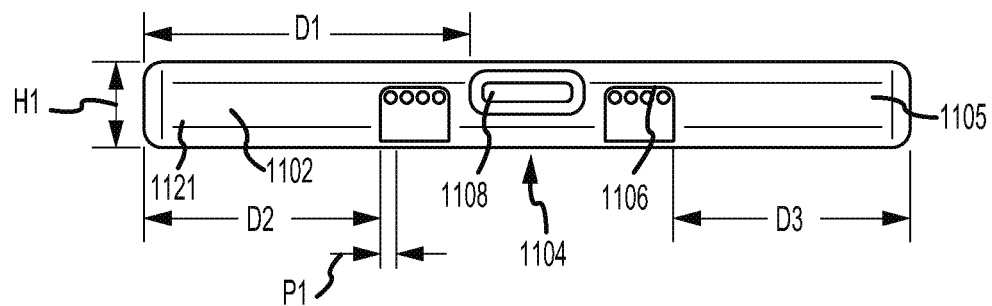
Figure 11D:
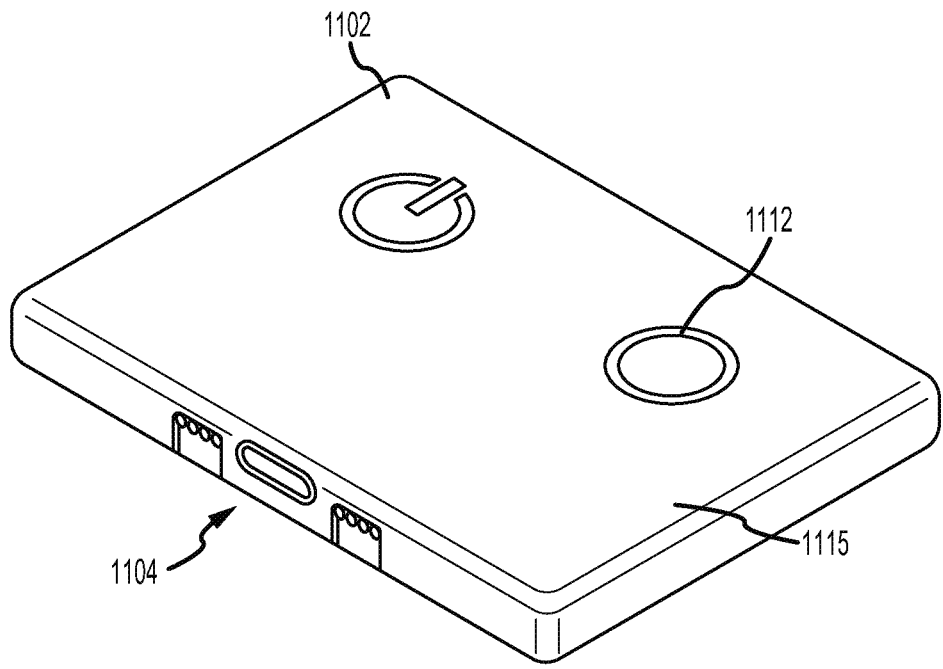
Figure 11E:
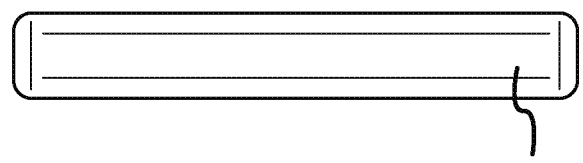

Referring now to FIG. 11C, an elevation view of housing 1102 is shown, in accordance with various embodiments. Surface 1121 of housing 1102 may have a height $H_1$. Height H1 may have a length of substantially 0.25 inches, for example. Electronic interface panel 1104 may also be defined in surface 1121 with conductive pads 1106 and data port 1108 exposed from surface 1121. The components defined in surface 1121 may be displaced from the edges of surface 1121 at symmetric and/or asymmetric locations on surface 1121. For example, data port 1108 may be offset from an edge of housing 1102 by a distance $D_1$. Distance $D_1$ may be substantially 1.025 inches, for example. Conductive pads may be offset from a first edge of housing 1102 by a distance $D_2$, and from a second edge of housing 1102 by a distance $D_3$. Distance $D_2$ and/or distance $D_3$ may be substantially 0.775 inches, for example. Distances $D_2$ and $D_3$ may also vary slightly such that $D_2$ is greater than or less than $D_3$. Conductive pads 1106 may have a pitch $P_1$. Pitch as used herein is defined to be the distance between successive corresponding points on adjacent conductive pads 1106. Pitch may describe the distance between the midpoints of adjacent conductive pads 1106, for example.

Figure 12A:
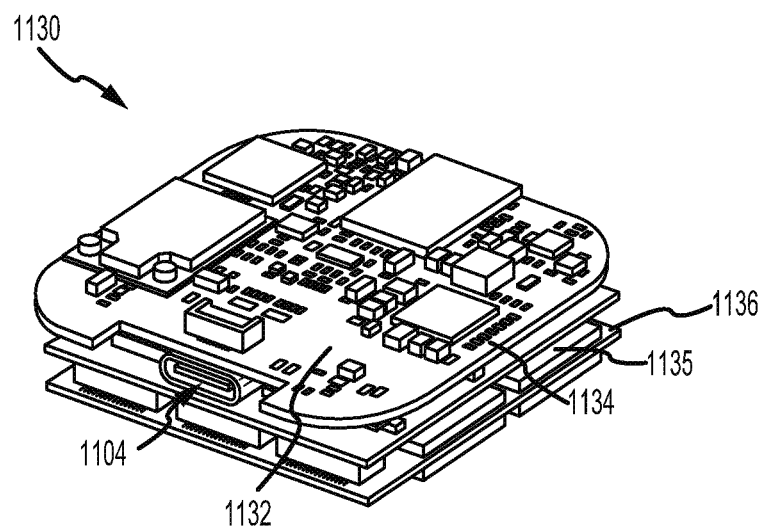
FIG. 12A illustrates a printed circuit board device comprising multiple circuit boards in a stacked configuration according to various embodiments.
Figure 12B:
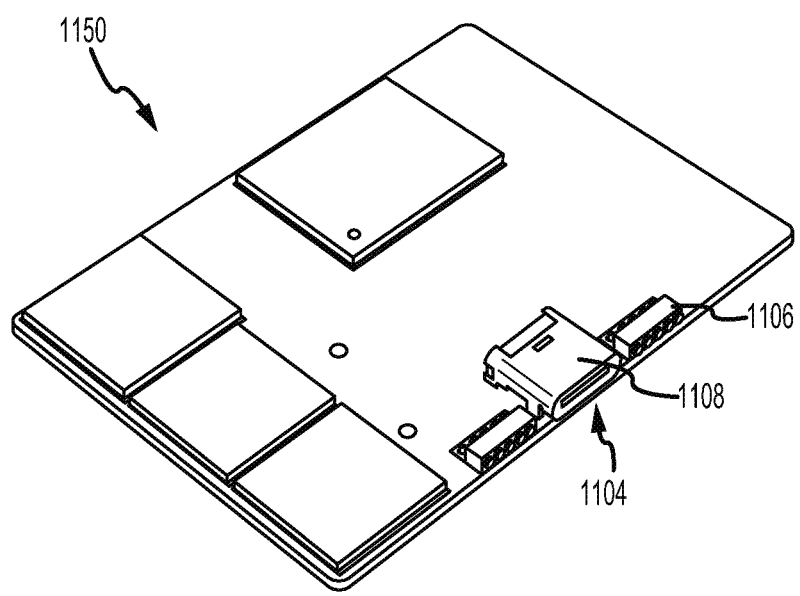
FIG. 12B illustrates a printed circuit board device comprising various chips and electronic components coupled to a circuit board according to various embodiments.
Figure 13A:
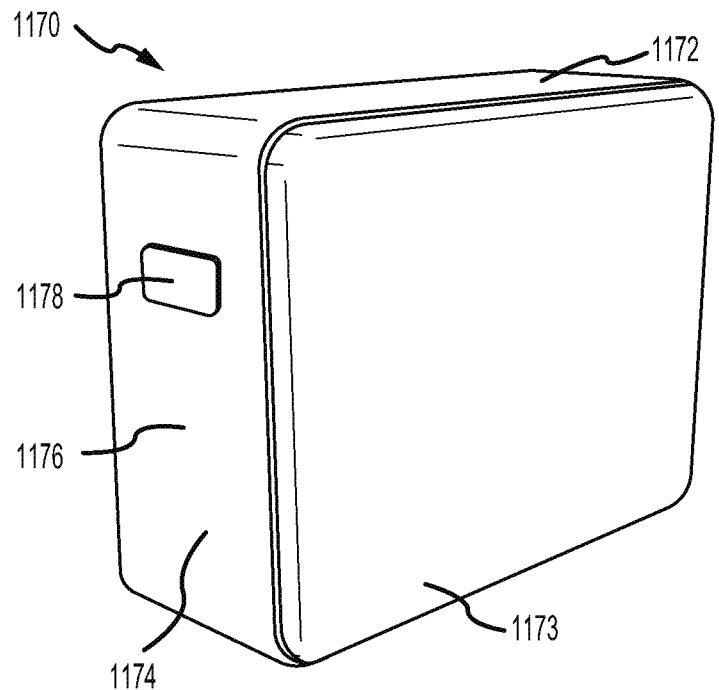
FIGS. 13A-13D illustrate a portable storage device assembly comprising an external housing, a power supply, and a portable storage device according to various embodiments.
Figure 13B:
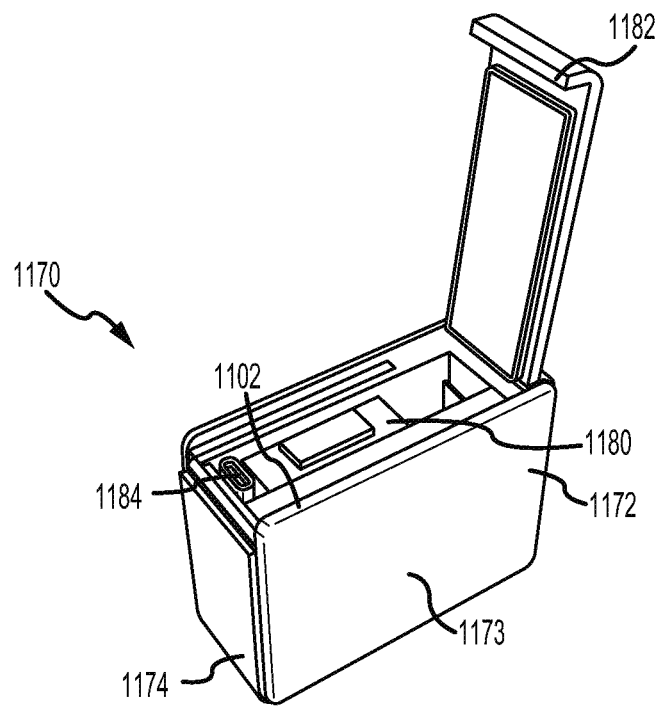
Figure 13C:
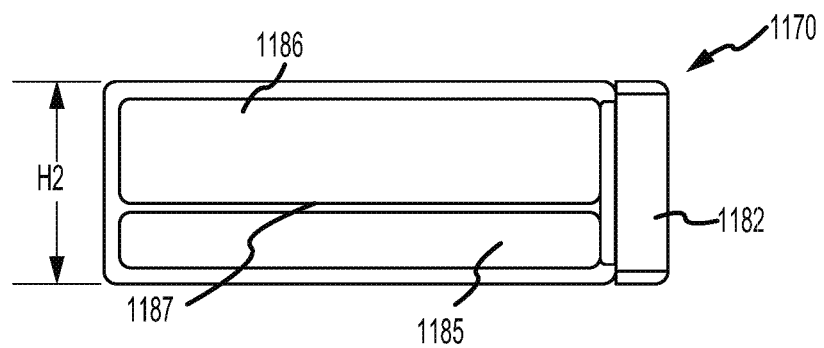
Figure 13D:
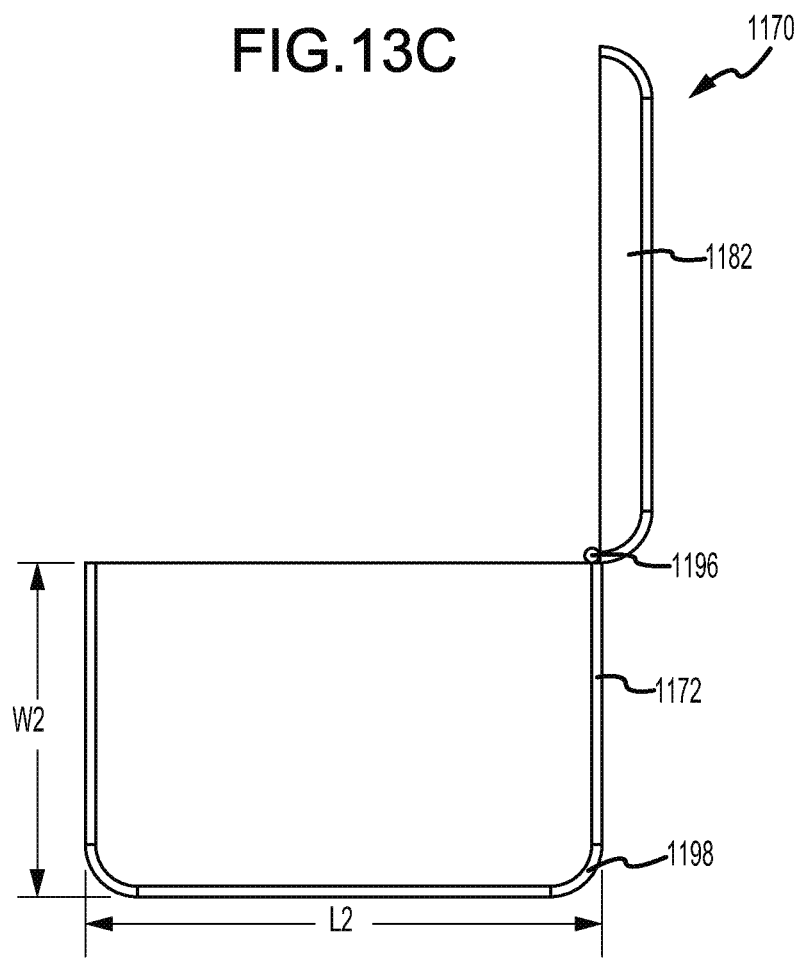
Figure 14A:
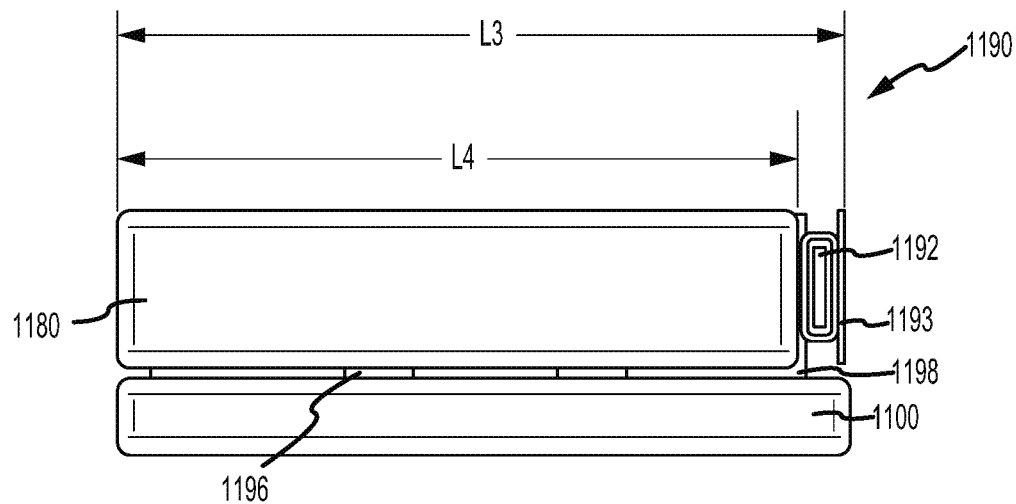
FIGS. 14A-14D illustrate an internal electronics assembly of a portable storage device assembly according to various embodiments.
Figure 14B:
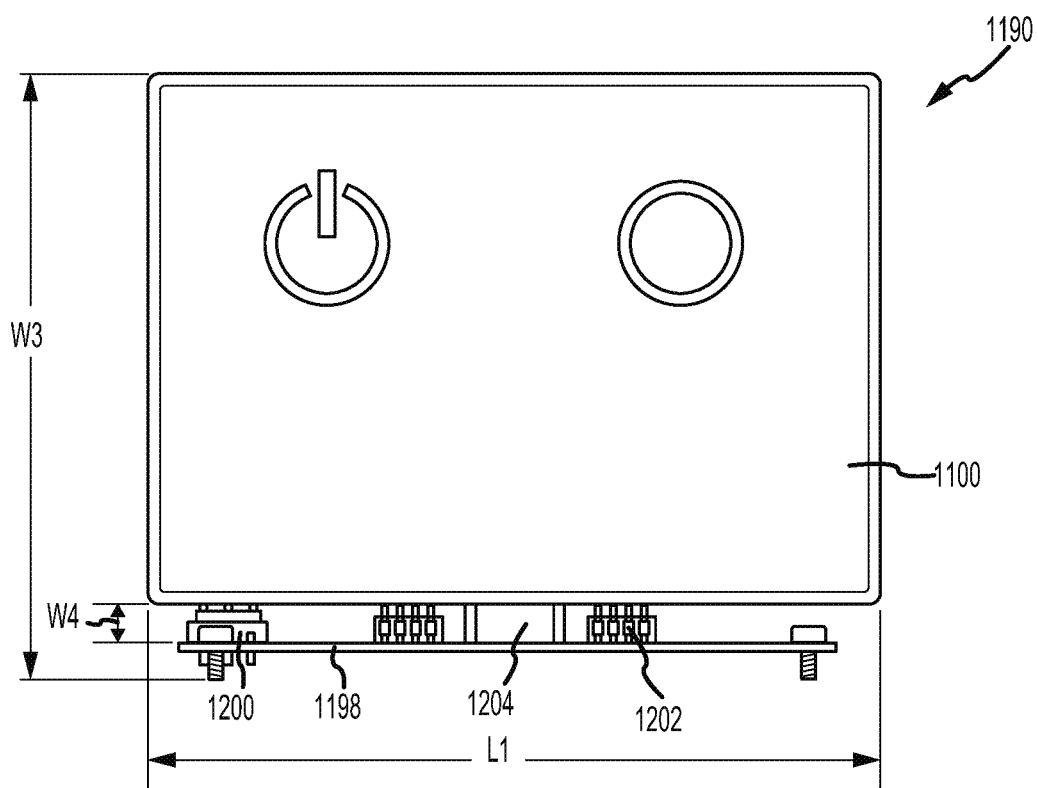
Figure 14D:
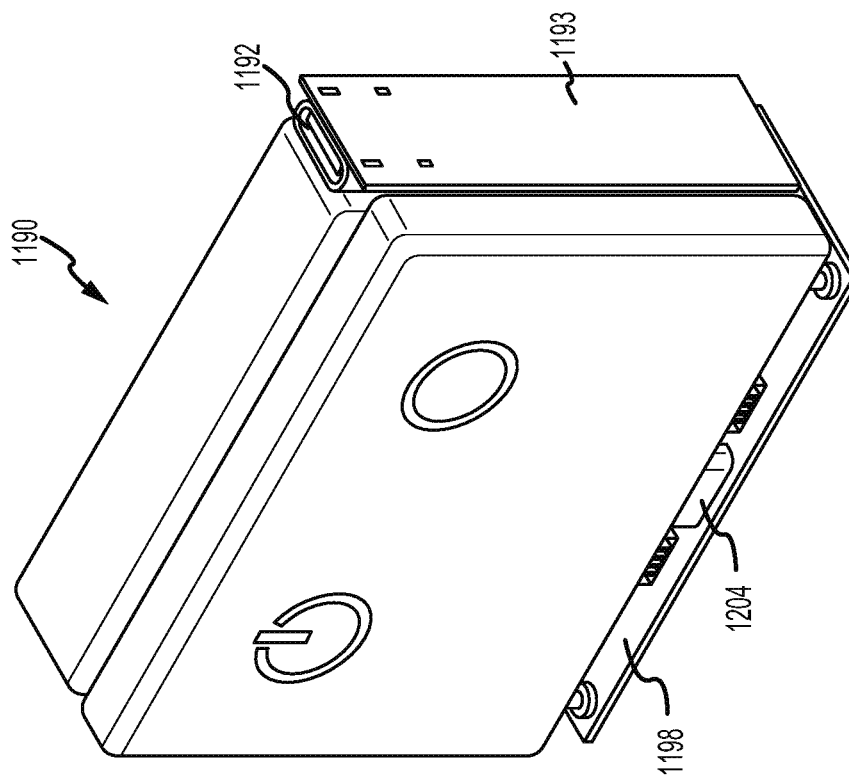
Figure 14C:
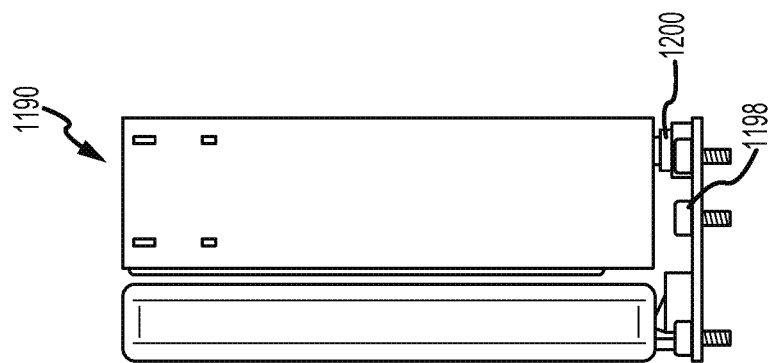

Referring now to FIGS. 12A and 12B, examples of internal components of portable storage device 1100 (of FIGS. 11A-11E) is shown, in accordance with various embodiments. FIG. 12A illustrates a printed circuit board (PCB) device 1130 having a stacked configuration. PCB device 1130 may include a main board 1132 having an electronic interface panel 1104 and various semiconductor chips suitable for wireless communication, processing, wired communication, storage access, or other otherwise providing functionality described herein. The semiconductor chips may be packaged as depicted using various packaging configurations such as ball grid array, flip chip, bumps-on-die, or other suitable techniques. One or more secondary PCBs 1134 and 1136 may be stacked with main board 1132. Secondary PCBs may include printed circuits, wires, and connections to various memory devices 1135 capable of storing digital data. PCB device 1130 may be retained partially or completely within housing 1102 (of FIGS. 11A-11E).

With reference to FIG. 12B, PCB device 1150 is shown, in accordance with various embodiments. PCB device 1150 includes various semiconductor chips as described above with reference to PCB device 1130. PCB device 1150 may have a smaller form-factor than PCB device 1130 based in part on PCB device 1150 using a single board construction. Electronic interface panel 104 may include conductive pads 1106 and data port 1108 soldered or otherwise connected to PCB device 1150 to effect electronic communication with PCB device 1150. Similar to PCB device 1130 described above, PCB device 1150 may be retained within portable storage device 1100 (of FIGS. 11A-11E) to enable the functionality of the portable storage device described herein. Housing 1102 may thus removably or permanently enclose the PCB devices of FIGS. 12A and 12B depending on the configuration of housing 1102.

With reference to FIGS. 13A-13D, a portable storage device assembly 1170 that supports modular configurations including portable storage device 1100 (of FIGS. 11A-11E) is shown, in accordance with various embodiments. Portable storage device assembly 1170 comprises an external housing 1172 that retains various components and protects the components from environmental hazards.

In various embodiments, components retained within external housing 1172 may include portable storage device 1100 and/or power supply 1180. Portable storage device 1100 and/or power supply 1180 may be removable coupled to external housing 1172. Power supply 1180 may comprise a battery and/or a wireless power receiver suitable for powering portable storage device 1100 and/or providing supplemental power to external devices via port 1184. Cap 1182 of external housing may be pivotally coupled to external housing 1172 by a pivot joint 1196 comprising a pin in a circular sleeve, for example.

In various embodiments, external housing 1172 may have a rectangular cuboid or rhomboid geometry larger than that of a portable storage device 1100 to be retained within the external housing. External housing 1172 may comprise a height $H_2$, a width $W_2$, and a length $L_2$. Height $H_2$ may be substantially 1 inch, for example. Width $W_2$ may be substantially 1.65 inches, for example. Length $L_2$ may be substantially 2.55 inches, for example.

In various embodiments, external housing may include an interface button 1178 and/or lighting 1176 in surface 1174 to facilitate communication with internals. Surface 1174, surface 1173, and/or cap 1182 may be finished with a variety of materials such as, for example, plastics, rubbers, synthetic materials, natural materials, or other suitable materials. For example, surface 1174 may comprise a smooth plastic with translucent and/or transparent portions to allow light to pass through surface 1174. External housing may also define internal cavity 1185 suitable for retaining portable storage device 1100 and/or internal cavity 1186 suitable for retaining a power supply 1180. A divider 1187 may separate internal cavity 1185 from internal cavity 1186 in various embodiments.

Referring now to FIGS. 14A-14D, an internal assembly 1190 is shown for electronic communication of power and/or data between power supply 1180 and portable storage device 1100 through PCB 1198. Internal assembly 1190 may be at least partially mounted, molded, bonded, glued, adhered, fastened, press fit, or otherwise mechanically coupled to external housing 1172 to form portable storage device assembly 1170 (of FIGS. 13A-13D). Internal assembly 1190 thus has dimensions suitable for retention within external housing 1172.

In various embodiments, power supply 1180, data port 1192, and PCB 1193 of internal assembly 1190 may have a combined length $L_3$, while power supply 1180 alone may have a shorter length $L_4$. Length $L_3$ may be substantially 2.39 inches, for example. Length $L_4$ may be substantially 2.225 inches, for example. The length of PCB 1193 and data port 1192 may be the difference between $L_3$ and $L_4$. Internal assembly 1190 may also have a width $W_3$, while PCB 1198, connector 1200, data adapter 1204, and conductive leads 1202 stand off from portable storage device 1100 by a width $W_4$. Width $W_3$ may be, for example, substantially 1.99 inches. Width $W_4$ may be, for example, substantially 0.12 inches.

In various embodiments, data adapter 1204 may engage, mate with, and/or form an electrical connection with data port 1108 (of FIG. 11). Conductive leads 1202 may engage, mate with, and/or form an electronic connection with conductive pads 1106 (of FIG. 11). The electronic connections enable electronic communication between portable storage device 1100 and PCB 1198. PCB 1198 may communicate electronic signals between other physically connected devices such as, for example, a power supply 1180 in the form of a battery or another external device in electronic communication with data port 1192.

Figure 15A:
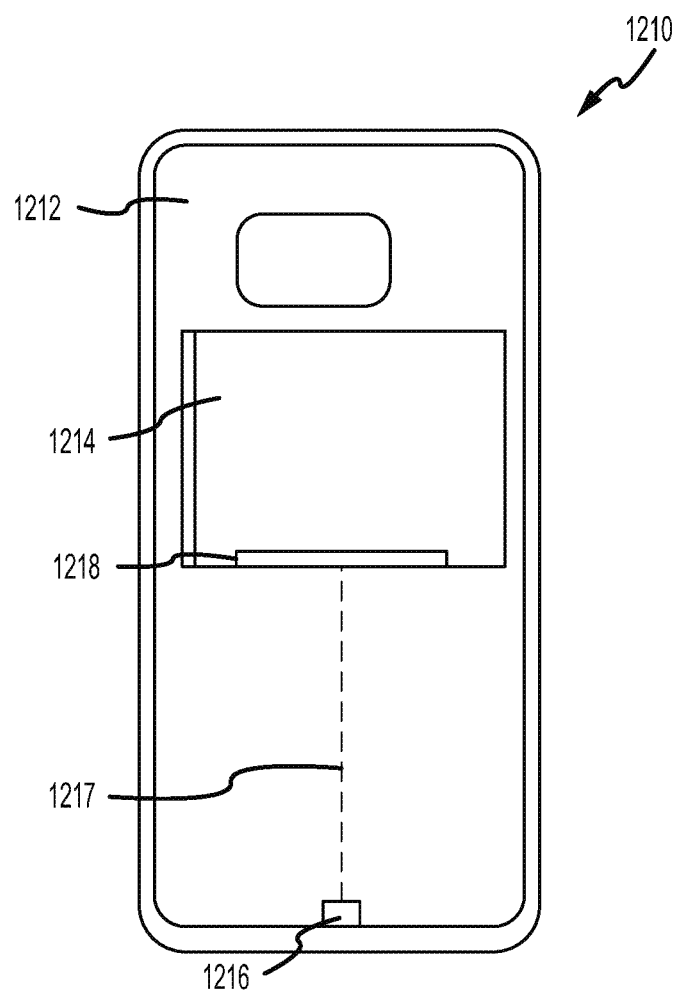
FIGS. 15A-15C illustrate a portable storage assembly comprising a case for mechanical attachment to a mobile device with a cavity suitable to retain a portable storage device according to various embodiments.
Figure 15B:
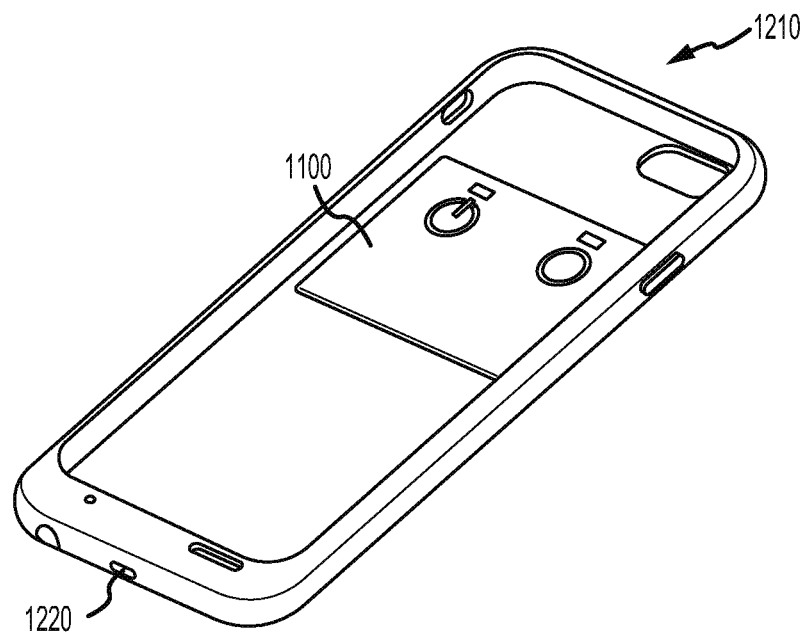
Figure 15C:
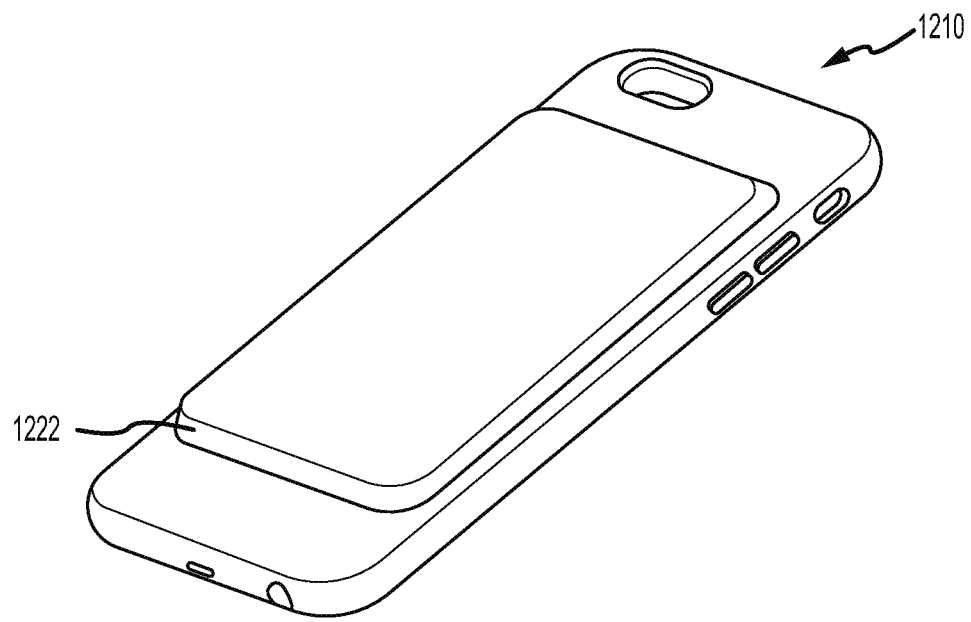

Referring now to FIGS. 15A-15C, a case 1212 for a mobile computing device is shown as a portable storage assembly 1210, in accordance with various embodiments. Case 1212 may fit on a portable computing device such as, for example, a tablet, smartphone, smart watch, laptop, or other suitable computing device. Case 1212 may have an interior contour matching that of a computing device to retain the computing device. Case 1212 may define cavity 1214 with a shape suitable to receive and retain with portable storage device 1100. In that regard, portable storage device 1100 may be removably coupled to case 1212, and cavity 1214 may have a geometry mirroring 5 sides of the portable storage device with an opening shaped like a surface of the portable storage device. The cavity may thus be defined by five orthogonal surfaces. The portable storage device may lie with a surface flush with the interior of case 1212.

In various embodiments, case 1212 may include interface 1218 suitable for communication with data port 1008 or conductive pads 1106 (of FIGS. 11A-11E). Interface 1218 may by electronically coupled to a data plug 1216 by an electrical conduit 1217 such as a wire. Data plug 1216 may interface with a corresponding data port on a computing device retained within case 1212. Data plug 1216 may thus plug into the bottom port on a smartphone to electrically couple case 1212 to the smartphone, for example. Case 1212 may further include a protrusion 1222 configured to house the PCBs and power supplies described herein as well as the cavity 1214.

In various embodiments, case 1212 may enable physical electronic communication between portable storage device 1100, a power supply (e.g., power supply 1180), a PCB (e.g., PCB 1198), or other electronic devices retained within case 1212. Case 1212 may further enable electronic communication of power and/or data to and/or from the mobile device retained within case 1212. Portable storage device 1100 may also be in wireless communication with the mobile device retained within case 1212 as described herein.

Figure 16:
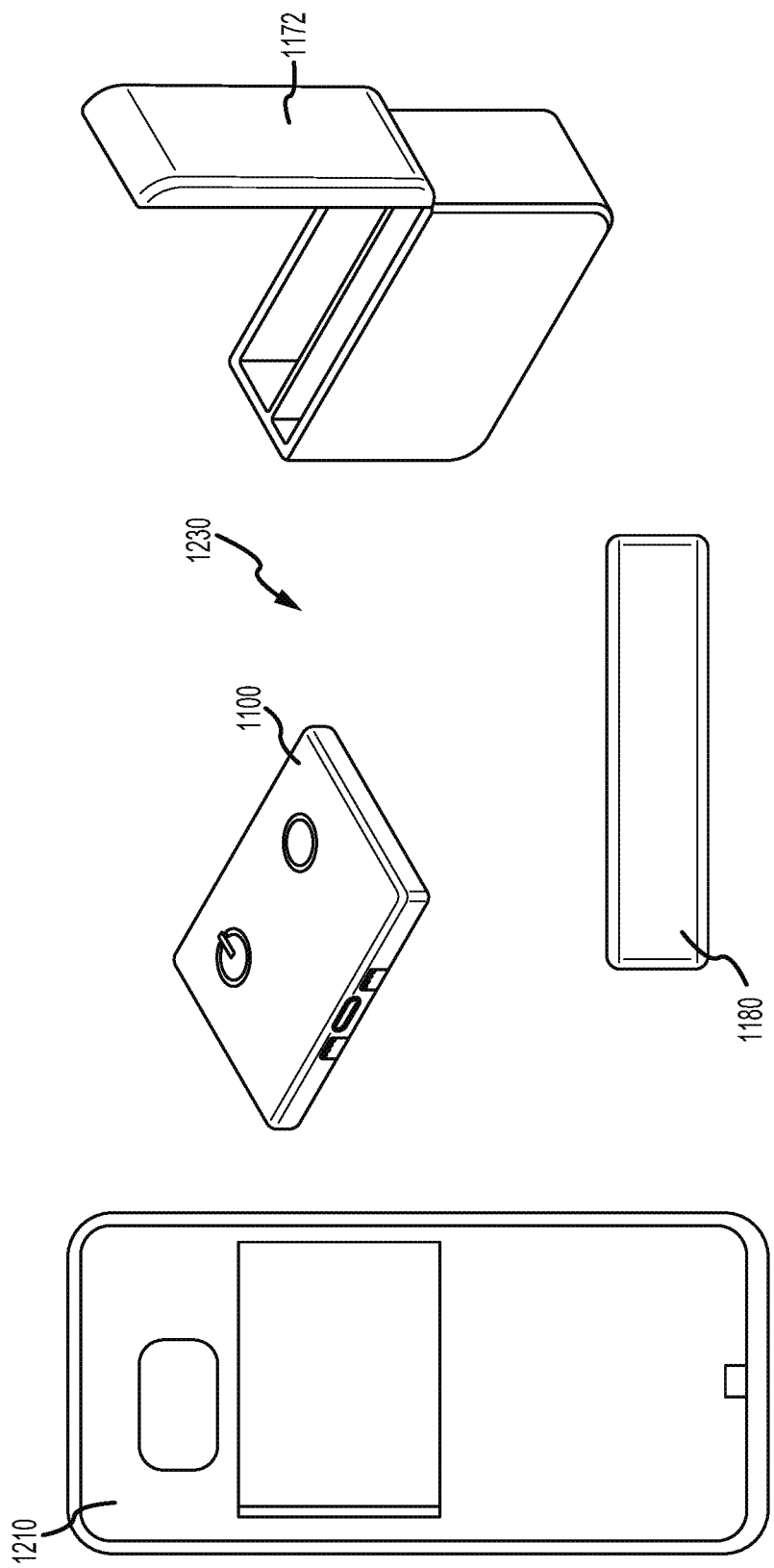
FIG. 16 illustrates a modular portable storage system having a case, an external housing, a portable storage device, and a power supply reconfigurable into various storage arrangements according to various embodiments.

Referring briefly to FIG. 16, a modular portable storage system 1230 is shown, in accordance with various embodiments. Modular portable storage system 1230 may include case 1212, portable storage device 1100, battery 1180, and/or external housing 1172. The various components described herein may be removable and interchangeably coupled to one another electronically and mechanically. In that regard, portable storage device 1100 may be utilized in various configurations to augment functionality of computing devices in communication with portable storage device 1100.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computers may include an operating system (e.g., Windows NT, Windows 95/98/2000, Windows XP, Windows Vista, Windows 7, OS2, UNIX, Linux, Solaris, MacOS, etc.) as well as various conventional support software and drivers typically associated with computers.

A network may include any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant), smart device (e.g., iPhone®, Palm Pilot®, Blackberry®, cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website, a uniform resource locator ("URL"), a document (e.g., a Microsoft Word document, a Microsoft Excel document, an Adobe .pdf document, etc.), an "ebook," an "emagazine," an application or microapplication (as described below), an SMS or other type of text message, an email, Facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include Facebook®, Foursquare®, Twitter®, MySpace®, LinkedIn®, and the like. Moreover, examples of mobile device communications include texting, email, and mobile applications for smartphones.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by a removable storage unit. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read-only memory (EPROM), or programmable read-only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless, and other communications channels.

The terms "computer program medium" and "computer usable medium" are used to generally refer to media such as a removable storage drive and a hard disk installed in a hard disk drive. These computer program products provide software to computer system.

Computer programs (also referred to as computer control logic) are stored in main memory and/or secondary memory. Computer programs may also be received via a communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs) are present. Implementation of the hardware state machine so as to perform the functions described herein will be apparent to persons skilled in the relevant art(s).

In various embodiments, the server may include application servers (e.g. WEB SPHERE, WEB LOGIC, JBOSS). In various embodiments, the server may include web servers (e.g. APACHE, IIS, GWS, SUN JAVA SYSTEM WEB SERVER).

As those skilled in the art will appreciate, a device may include but is not limited to an operating system (e.g., Windows NT, 95/98/2000/CE/Mobile, OS2, UNIX, Linux, Solaris, MacOS, PalmOS, etc.) as well as various conventional support software and drivers typically associated with computers. A device may include but is not limited to any suitable personal computer, network computer, workstation, personal digital assistant, cellular phone, smart phone, mini-computer, mainframe or the like. A device can be in a home or business environment with access to a network. In various embodiments, access is through a network or the Internet through a commercially available web-browser software package. A device may implement security protocols such as Secure Sockets Layer (SSL) and Transport Layer Security (TLS). A device may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/groups/SNS/cloud-computing/cloud-def-v15.doc (last visited Feb. 4, 2011), which is hereby incorporated by reference in its entirety.

As used herein, "transmit" may include sending electronic data from one system component to another. Additionally, as used herein, "data" may include encompassing information such as commands, queries, files, data for storage, and the like in digital or any other form.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

The computing unit of the device may be further equipped with an Internet browser connected to the Internet or an intranet using standard dial-up, cable, DSL or any other Internet protocol known in the art. Transactions originating at a device may pass through a firewall in order to prevent unauthorized access from users of other networks. Further, additional firewalls may be deployed between the varying components of the system to further enhance security.

The computers discussed herein may provide a suitable website or other Internet-based graphical user interface which is accessible by users. In various embodiments, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In various embodiments, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQTM (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the system may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. Reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A modular portable storage system, comprising:
   a portable storage device comprising a first housing, the first housing retaining at least one of a storage module or a wireless communication module;
   a power supply; and
   a second housing including the portable storage device and the power supply therewithin, the second housing being configured to be separable from the first housing,
   a circuit board in electronic communication with the portable storage device and the power supply, wherein the portable storage device further comprises: a processor; and a data port, wherein the data port is exposed from a first surface of the portable storage device,
   wherein the portable storage device further comprises conductive pads exposed from the first surface of the portable storage device,
   a case for a mobile device defining a cavity configured to retain the portable storage device, and
   wherein the case further comprises an interface disposed in the cavity and configured for electronically coupling to at least one of the conductive pads or the data port.

2. The modular portable storage system of claim 1, wherein the data port is disposed between at least two of the conductive pads.

3. The modular portable storage system of claim 1, wherein the case further comprises a data plug in electronic communication with the interface and configured to engage a plug on the mobile device.

4. The modular portable storage system of claim 1, wherein the case further comprises a protrusion configured to house the cavity.

5. The modular portable storage system of claim 4, wherein the protrusion is configured to house the power supply.

6. A modular portable storage system, comprising:
   a portable storage device comprising a first housing, wherein the first housing retains at least one of a processor, a storage module, or a wireless communication module;
   an electronic interface panel on a first surface of the first housing, the electronic interface panel comprising at least one of a data port or a conductive pad;
   a human interface panel defined by a second surface of the first housing and comprising at least one of a button or a light source; and
   a second housing comprising a first cavity configured to receive a mobile device and a second cavity defined by the first housing,
   wherein each of the first cavity and the second cavity are defined by a set of five respectively orthogonal surfaces.

7. The modular portable storage system of claim 6, wherein the second cavity is defined within the first cavity.

8. The modular portable storage system of claim 6, wherein the second housing further comprises an interface disposed in the second cavity and electronically coupled to the electronic interface panel.

9. The modular portable storage system of claim 6, wherein the second housing further comprises a data plug disposed within the first cavity and configured to electronically communicate with the mobile device.

10. The modular portable storage system of claim 6, wherein the second housing further comprises a protrusion defined by the second cavity.

11. The modular portable storage system of claim 10, further comprising a power supply disposed within the protrusion.

12. A portable storage system, comprising:
    a processor;
    a first housing retaining the processor and a tangible, non-transitory memory, wherein the housing is defined by a height, a width, and a length;
    a human interface panel defined by a first surface of the first housing and comprising at least one of a button or a light source, wherein the first surface is defined by the length and the width of the first housing,
    wherein the first housing is configured to couple within a second cavity of a second housing, the second housing comprising a first cavity configured to receive a mobile device and the second cavity defined by the first housing,
    wherein each of the first cavity and the second cavity are defined by a set of five respectively orthogonal surfaces; and
    the tangible, non-transitory memory configured to communicate with the processor,
    the tangible, non-transitory memory having instructions stored thereon that, in response to execution by the processor, cause the processor to perform operations comprising:
    encrypting, by the processor, a file to generate an encrypted file; and
    storing, by the processor, the encrypted file on the tangible, non-transitory memory.

13. The portable storage system of claim 12, wherein the height is about 0.25 inches, the length is about 2.4 inches, and the width is about 1.75 inches.

14. The portable storage system of claim 12, further comprising an electronic interface panel in electronic communication with a circuit board, wherein the electronic interface panel is disposed on a second surface of the first housing, wherein the second surface is orthogonal to the first surface.

15. The portable storage system of claim 12, further comprising a wireless chip in electronic communication with a circuit board and the processor, wherein the wireless chip and the circuit board are retained within the first housing.

* * * * *